US009396588B1

(12) United States Patent
Li

(10) Patent No.: US 9,396,588 B1
(45) Date of Patent: *Jul. 19, 2016

(54) VIRTUAL REALITY VIRTUAL THEATER SYSTEM

(71) Applicant: Ariadne's Thread (USA), Inc., Solana Beach, CA (US)

(72) Inventor: Adam Li, Solana Beach, CA (US)

(73) Assignee: Ariadne's Thread (USA), Inc. (DBA Immerex), Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/852,202

(22) Filed: Sep. 11, 2015

Related U.S. Application Data

(63) Continuation-in-part of application No. 14/788,633, filed on Jun. 30, 2015, now Pat. No. 9,240,069.

(51) Int. Cl.
*G06T 19/00* (2011.01)
*G06T 15/00* (2011.01)
*G06T 3/00* (2006.01)

(52) U.S. Cl.
CPC ............ *G06T 19/003* (2013.01); *G06T 3/0093* (2013.01); *G06T 15/00* (2013.01); *G06T 19/006* (2013.01); *G06T 2210/61* (2013.01); *G06T 2215/12* (2013.01)

(58) Field of Classification Search
CPC ............ G06F 3/04815; H04N 21/8146; A63F 2300/8082; G06T 19/006; G06T 19/00; G06T 15/00; G06T 3/005
See application file for complete search history.

(56) References Cited

U.S. PATENT DOCUMENTS

| 5,841,439 A | 11/1998 | Pose et al. |
| 6,445,815 B1 | 9/2002 | Sato |
| 2011/0018903 A1 | 1/2011 | Lapstun et al. |
| 2015/0097858 A1* | 4/2015 | Miki ...................... G06T 3/005 345/629 |

OTHER PUBLICATIONS

D3, Realtime 3d simulation, posted on http://www.d3technologies.com/features/3d_simulation on Dec. 10, 2013, retrieved from Internet Archive Wayback Machine on Oct. 28, 2015.*

* cited by examiner

*Primary Examiner* — Haixia Du
(74) *Attorney, Agent, or Firm* — Arc IP Law, PC; Joseph J. Mayo

(57) ABSTRACT

A virtual reality virtual theater system that generates or otherwise displays a virtual theater, for example in which to view videos, such as movies or television. Videos may be for example 2D or 3D movies or television programs. Embodiments create a virtual theater environment with elements that provide a theater-like viewing experience to the user. Virtual theaters may be for example indoor movie theaters, drive-in movie theaters, or home movie theaters. Virtual theater elements may include for example theater fixtures, décor, and audience members; these elements may be selectable or customizable by the user. One or more embodiments also render sound by placing virtual speakers in a virtual theater and projecting sounds from these virtual speakers onto virtual microphones corresponding to the position and orientation of the user's ears. Embodiments may also employ minimal latency processing to improve the theater experience.

22 Claims, 29 Drawing Sheets

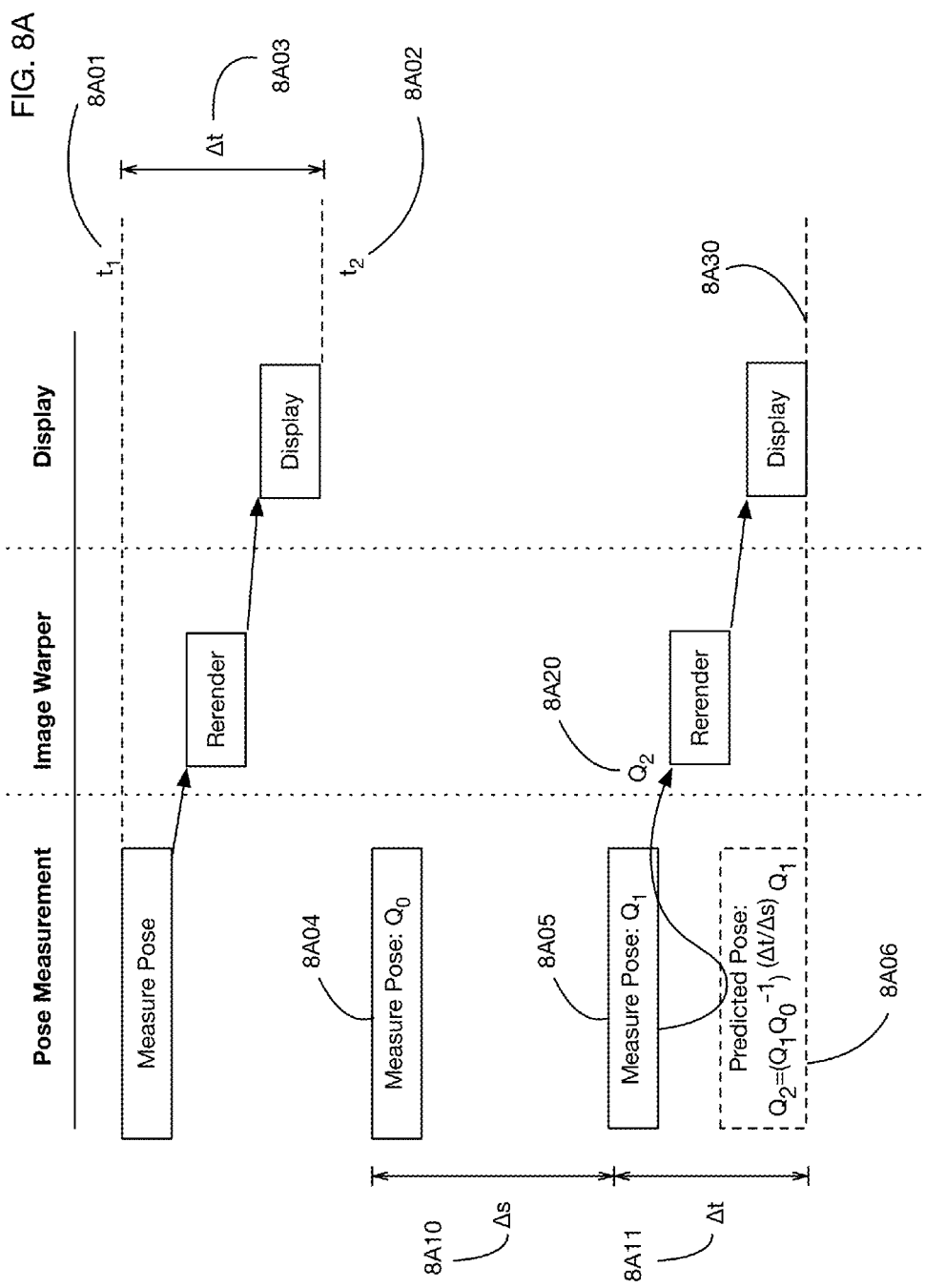

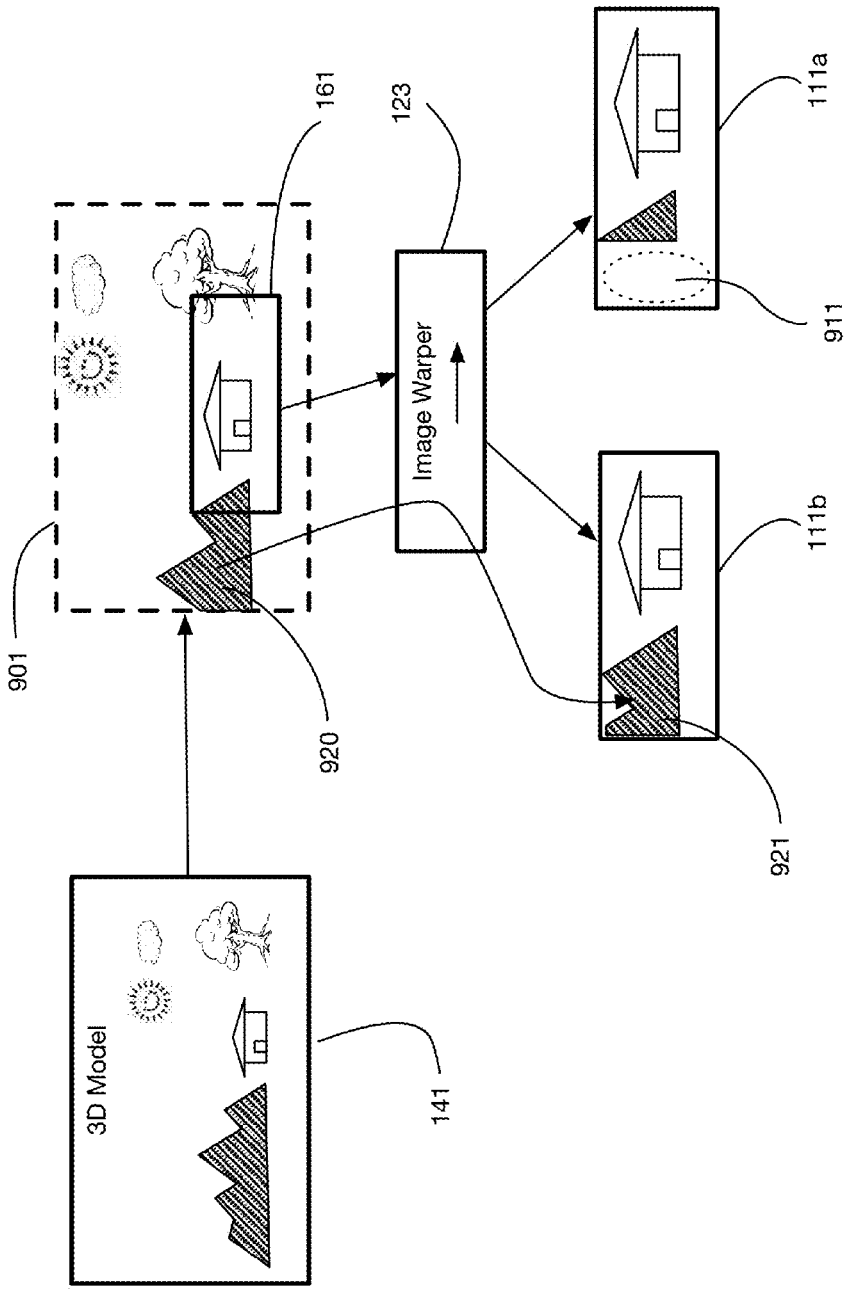

VIRTUAL REALITY VIRTUAL THEATER SYSTEM

This application is a continuation in part of U.S. Utility patent application Ser. No. 14/788,633 filed Jun. 30, 2015, the specification of which is hereby incorporated herein by reference.

BACKGROUND OF THE INVENTION

1. Field of the Invention

One or more embodiments of the invention are related to the field of virtual reality systems. More particularly, but not by way of limitation, one or more embodiments of the invention enable a virtual reality virtual theater system that generates or otherwise displays a virtual theater, for example in which to view videos, such as movies or television. In addition, embodiments may also employ minimal latency processing to improve the theater experience.

2. Description of the Related Art

Virtual reality systems are known in the art. Such systems generate a virtual world for a user that responds to the user's movements. Examples include various types of virtual reality headsets and goggles worn by a user, as well as specialized rooms with multiple displays. Virtual reality systems typically include sensors that track a user's head, eyes, or other body parts, and that modify the virtual world according to the user's movements. The virtual world consists of a three-dimensional model, computer-generated or captured from real-world scenes. Images of the three-dimensional model are generated based on the user's position and orientation. Generation of these images requires rendering of the three-dimensional model onto one or more two-dimensional displays. Rendering techniques are known in the art and are often used for example in 3D graphics systems or computer-based games, as well as in virtual reality systems.

A major challenge for existing virtual reality systems is combining realistic images with low-latency rendering, so that user's virtual reality experience matches the rapid feedback to movement observed in real environments. Existing systems often have long latency to measure changes in the user's position and orientation, and to rerender the virtual world based on these changes. 3D rendering is a complex and processor intensive operation that can take potentially hundreds of milliseconds. The result is that users perceive noticeable lag between their movements and the rendering of updated virtual environments on their displays. Three technology trends are compounding this challenge: (1) The complexity of 3D models is growing as more 3D data is captured and generated. (2) Resolution of virtual reality displays is increasing, requiring more computational power to render images. (3) Users are relying increasingly on mobile devices with limited processor capacity. As a result of these trends, high latency in rendering virtual reality displays has become a major factor limiting adoption and applications of virtual reality technology. There are no known systems that provide sufficiently low-latency rendering and display to generate highly responsive virtual reality environments given these technology constraints.

Virtual reality systems known in the art typically incorporate or access content such as a 3D virtual reality model that is specifically designed for a virtual reality experience. For example, virtual reality content may provide complete 360-degree views of a real or computer-generated scene. However, an immense amount of recorded video content exists and continues to be generated that is designed for viewing on a traditional screen with a fixed and limited field of view. This traditional video content includes vast numbers of movies and television programs. While it is possible to use a virtual reality system as a video player to view this traditional content, this approach offers little advantage compared to viewing the content on a non-virtual reality screen. There are no known systems that combine the advantages of a virtual reality environment with traditional video content to provide an immersive viewing experience for this content. In particular, there are no known systems that embed traditional video into a virtual world in order to enhance the user's viewing experience.

For at least the limitations described above there is a need for a virtual reality virtual theater system that generates or otherwise displays a virtual theater, for example in which to view videos, such as movies or television.

BRIEF SUMMARY OF THE INVENTION

One or more embodiments described in the specification are related to a virtual reality virtual theater system that generates or otherwise displays a virtual theater, for example in which to view videos, such as movies or television.

One or more embodiments of the system use efficient approximations to rerender virtual reality displays quickly in response to changes in the position or orientation of a user. This efficient and rapid rerendering reduces latency and improves the user's virtual reality experience.

One or more embodiments of the system include one or more displays viewable by a user. For example, these displays may be embedded in virtual reality goggles or glasses. One or more embodiments also include one or more sensors that measure aspects of the user's position, orientation, or both. Aspects of the user's orientation and position are referred to as the user's "pose" in this specification. Pose sensors may for example measure movements of the user's head, or of the user's eyes, or more generally of any body part or parts of the user. Embodiments of the system include a pose analyzer that receives sensor data and determines the user's pose from this data. The pose information is passed to a scene renderer, which generates the 3D virtual reality display viewed by the user. This display shows a portion of a 3D scene model that is visible to the user based on the user's current pose. The 3D scene model is the model of the virtual world that the user navigates through by changing pose.

The scene renderer generates one or more 2D projections from the 3D scene model. In one or more embodiments, these projections may be generated using well known 3D graphics techniques, for example using virtual cameras and perspective projection transformations onto the view planes of the virtual cameras. The 2D projections are then transmitted to the displays.

In addition, one or more embodiments of the system include an image warper. The image warper is the system component that provides for low-latency virtual reality display via efficient rerendering of scenes. The image warper may for example monitor the pose changes of the user and rerender displayed images based on these pose changes. The rerendering performed by the image warper may be a rerendering approximation, rather than a full perspective projection from the original 3D scene model. For example, some embodiments perform rerendering approximations by warping display images in relatively simple ways to partially reflect the changes in the user's pose. These rerendering approximations may offer lower latency display updates, although in some embodiments they may not be fully realistic compared to the full rendering process.

One or more embodiments of the system perform approximate rerendering by calculating a pixel translation vector, and then translating pixels of the display by this pixel translation vector. Effectively the image warper in these embodiments may shift pixels in a calculated direction and by a calculated amount to approximate the effect of the user's movements on the display. This approximation is not full 3D rendering, but it can be performed very quickly in some embodiments, greatly reducing latency between user's movements and display updates.

One or more embodiments of the system may use hardware acceleration to modify the pixels of a display to perform approximate rerendering. For example, display hardware or graphics processing unit hardware may support commands to directly shift pixels based on a pixel translation vector. Implementing pixel translations or other approximate rerendering transformations in hardware may further reduce latency in one or more embodiments.

In one or more embodiments, the rerendering approximations performed by the image warper may only be performed if the pose changes of a user are below a particular threshold value. For large changes in pose, the approximations used by the image warper may become inadequate, and it may be preferable to perform a full 3D rendering despite the high latency. For small changes in pose, the rerendering approximations may be sufficiently realistic.

In one or more embodiments, multiple pose changes for a user may be received while a full 3D rendering process is executed. By the time the 3D rendering process has completed, the initial user pose that was used for the rendering may be out of date, since newer pose data is by then available. One or more embodiments may perform a post-rendering correction on the rendered images, using the image warper to apply updates to the rendered images prior to displaying them. These post-rendering corrections may improve synchronization between the displayed images and the user's current pose.

One or more embodiments of the system may use pose prediction to calculate or estimate the pose of a user at a future time when the rendering and display processes are complete. Pose prediction may reduce the apparent latency between changes in user pose and corresponding display updates. One or more embodiments may use pose prediction for full rendering, for image warping, or for both. Embodiments may use any desired technique for pose prediction, including for example simple extrapolation of pose changes. With pose prediction, the predicted pose is provided to the rendering or approximate rerendering processes, rather than the measured pose. The rendering process calculates virtual camera poses from the predicted pose values, and renders a scene based on these virtual camera poses. The image warper calculates pose changes using the difference between the predicted future pose and the previously calculated virtual camera pose from full rendering of the scene.

One challenge faced by some embodiments is that the image warping process may leave holes in the display images with missing pixels. For example, if all pixels are shifted to the right, then the left edge of the display will have a hole without pixel data. Embodiments may employ various approaches to handle these holes. In one or more embodiments, the 3D renderer may render 2D projections that are larger than the display area. Pixels outside the display area may be cached in these embodiments in an off-screen cache, and retrieved when performing image warping to fill holes.

Another approach to filling holes employed by one or more embodiments is to estimate pixel values for the holes based on the pixel values of nearby pixels. For example, in one or more embodiments pixel values from the boundaries of regions may be propagated into the holes to fill them. Simple propagation of boundary pixels into holes may in some cases result in visual artifacts. In one or more embodiments, blur transformations may be applied to pixels in the holes or near the holes to reduce these artifacts.

One or more embodiments may employ various types of rerendering approximations for image warping. One technique used by some embodiments is to generate a simplified 3D model from the 2D projections received from the scene rendered, and to reproject these simplified 3D models onto the updated view planes that correspond to changes in the user's pose. For example, one or more embodiments may create a simplified 3D model by mapping a 2D projection from rendering onto another plane in the simplified 3D model, where the distance of this plane from the user reflects an average or typical depth of the objects in the complete 3D scene model. The depth of such an average plane may be fixed, or it may be supplied by the scene renderer with each 2D projection. One or more embodiments may use other simplified 3D models, such as spherical or cylindrical surfaces for example.

For small changes in pose, rerendering approximations based on reprojecting from a simplified 3D planar model may be approximately equivalent to using a pixel translation vector to shift pixels in display images in response to pose changes. For example, one or more embodiments may calculate a pixel translation vector for a rotation of a user around axis $\omega$ by a small angle $\Delta\theta$ as $(\hat{\omega}_y\Delta\theta, -\hat{\omega}_x\Delta\theta)$, which is then scaled to the reflect the pixel dimensions of the display. This formula reflects that small angular rotations of a user's view approximately result in pixels shifting in response to the rotations, with the amount of shift proportional to the angle of rotation. Changes in user pose may also involve translations (linear motions of the user). For translations, the amount of shifting of pixels is also a function of the distance of objects from a user: the closer the object to the user, the more pixels shift in response to user translations. In one or more embodiments, a rerendering approximation may be estimated by a pixel translation vector using an average depth estimate z* for the distance between the user and the objects in the 2D projection. These embodiments may calculate a pixel translation vector for a user translation by small vector $\Delta r$ as $(-\Delta r_x/z^*, -\Delta r_y/z^*)$, which is then scaled to reflect the pixel dimensions of the display. This formula reflects that objects that are further away shift less than objects that are closer. It also reflects that pixels shift in the direction opposite to the movement of the user. One or more embodiments may user pixel translation vectors for rerendering approximations that combine the above effects of user rotation and user translation, such as for example $(\hat{\omega}_y\Delta\theta-\Delta r_x/z^*, -\hat{\omega}_x\Delta\theta-\Delta r_y/z^*)$.

The embodiments of the invention described above enable a low-latency virtual reality display by using techniques to efficiently and approximately rerender images based on changes in the user's pose. Such techniques include, but are not limited to, shifting pixels by a pixel translation vector that is calculated from the user's movements. One or more embodiments may provide additional features such as filling of holes generated by image warping, and applying corrections prior to displaying rendered images to synchronize them with the user's current pose.

One or more embodiments of the invention use virtual reality hardware or software (or both) to create a virtual theater for viewing videos. Videos viewed using the system may be for example 2D or 3D videos that were not created specifically for a virtual reality environment; the system may create a virtual theater environment in which these videos may be played and viewed. One or more embodiments may display a video and a virtual theater on one or more displays, such as for example a display or displays located in front of the eyes of a user in a virtual reality headset. Embodiments of the system may incorporate sensors and a pose analyzer to determine the pose of a user or of one or more body parts of a user, and may use this pose data to determine the view of the virtual theater displayed to the user.

One or more embodiments may use, access, or generate a 3D model of a virtual theater. This 3D model may for example include a virtual screen, a virtual video projector, and one or more theater environment elements. Theater environment elements may include any elements that define, describe, or depict the theater or the viewing environment. For an indoor theater these elements may include for example, without limitation, walls, floors, ceilings, lights, curtains, seats, aisles, decorative elements on the walls or ceiling or anywhere in the model, and one or more persons or characters. A virtual theater may be for example, without limitation, an indoor movie theater, an outdoor movie theater such as for example a drive-in, or a home theater. One or more embodiments may animate one or more elements in a 3D model of a virtual theater. For example, without limitation, characters may move or talk, curtains may open or close or move up or down, seats may move, or lights may turn on or off or change in intensity.

One or more embodiments include a scene renderer that generates one or more images of a 3D virtual theater model. Frames from a video may be obtained from via video input, which may be any hardware or software or combination that accepts a video file or stream or media. The scene renderer may project the video frames successively from the virtual projector onto the virtual screen. It may then render one or more images of the virtual screen and of the other elements of the 3D virtual theater from the perspective of the viewer. The viewer's perspective is determined by the pose analyzer, which transmits pose data to the scene renderer. The scene renderer positions and orients one more virtual cameras in the 3D virtual theater model, and projects the 3D model (which includes the projected video frame on the virtual screen) onto the virtual cameras to form display images. Display images are then transmitted to the display or displays of the system.

In one or more embodiments the virtual screen of a virtual theater may be curved. The screen may be of any size or shape or dimensions. In one or more embodiments the system may select the size or shape or dimensions of the virtual screen based for example on the format of the video. For example, the system may set an aspect ratio of the virtual screen to correspond to the aspect ratio of the video, in order to avoid, minimize, or optimize techniques such as letterboxing that handle incompatible aspect ratios.

One or more embodiments may provide a theater configuration subsystem that allows a user to configure one or more aspects of the virtual theater model. For example, without limitation, in one or more embodiments a user may be able to select or customize the type or location of the theater, the elements within the theater, the type or size or curvature of the screen, or the number and identities of virtual audience members or other characters in the theater. In one or more embodiments a user may select his or her location in the virtual theater, for example by choosing a seat from a seat map. The scene renderer may for example render views of the virtual theater from the user's selected location, possibly modified by changes in the user's pose received from the pose analyzer.

One or more embodiments may accept and play 3D videos in a virtual theater. These embodiments may for example obtain left and right images from a stereoscopic image pair associated with each frame of the video, and project these separately onto the virtual screen of the virtual theater to form left and right eye display images for the user. In addition to displaying the stereo images from the video, the scene renderer may render the 3D virtual theater model from two different viewpoints corresponding the left and right eyes of the user. Thus the user may view both the video and the virtual theater in 3D.

One or more embodiments may render virtual theater sounds as well as display images. For example, one or more embodiments may include one or more speakers that project sound towards the ears of the viewer, such as for example stereo speakers in stereo headphones integrated into a virtual reality headset. One or more embodiments may incorporate one or more virtual speakers into a 3D virtual theater model; these virtual speakers may define for example the location, orientation, and sound parameters of the speakers within the theater. One or more embodiments may include a sound renderer that obtains one or more audio tracks from a video, sends these audio tracks to one or more of the virtual speakers, and positions virtual microphones in the 3D model to record sound emitted by the virtual speakers. The location and orientation of the virtual microphones may correspond for example to the pose data received from the pose analyzer. For example, in an embodiment with stereo headphones, the system may position and orient a left virtual microphone and a right virtual microphone corresponding respectively to the position and orientation of the left ear and right ear of the user watching and listening to the video. Sound received on the virtual microphones may be sent to the real speakers that play sound for the user. In one or more embodiments the system may generate or synthesize additional sounds in the virtual theater beyond those obtained from the audio tracks of a video. For example, an embodiment may generate sounds such as laugh tracks or other expressions from audience members in a virtual theater. The audio renderer may render sounds that reflect a combination of the audio tracks from the video played through virtual speakers and these synthesized sounds emitted from one or more theater environment elements.

One or more embodiments may obtain one or more audio commentary tracks from a video, and may send these commentary tracks to designated locations in the virtual theater. For example, one or more embodiments may generate a virtual commentator character in the virtual theater, for example as an audience member, and may play a commentary track as if it is emitted by this virtual commentator character. For example, without limitation, a virtual commentator may be selected by the system or by the user to correspond with an actor or an actress, an animated character, a director, a producer, a critic, a journalist, an author, a historical figure, or a historian. In one or more embodiments the system may generate a virtual character that represents or resembles a real commentator from whom a commentary track was recorded.

BRIEF DESCRIPTION OF THE DRAWINGS

The above and other aspects, features and advantages of the invention will be more apparent from the following more particular description thereof, presented in conjunction with the following drawings wherein:

FIG. 8A shows a swimlane diagram for an embodiment of the system that use pose prediction to reduce apparent latency between pose changes and display updates.

FIG. 9 illustrates an embodiment of the system that renders a scene larger than the display into an offscreen buffer, in order to fill holes generated by low-latency rerendering transformations.

DETAILED DESCRIPTION OF THE INVENTION

A virtual reality virtual theater system that generates or otherwise displays a virtual theater, for example in which to view videos, such as movies or television will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
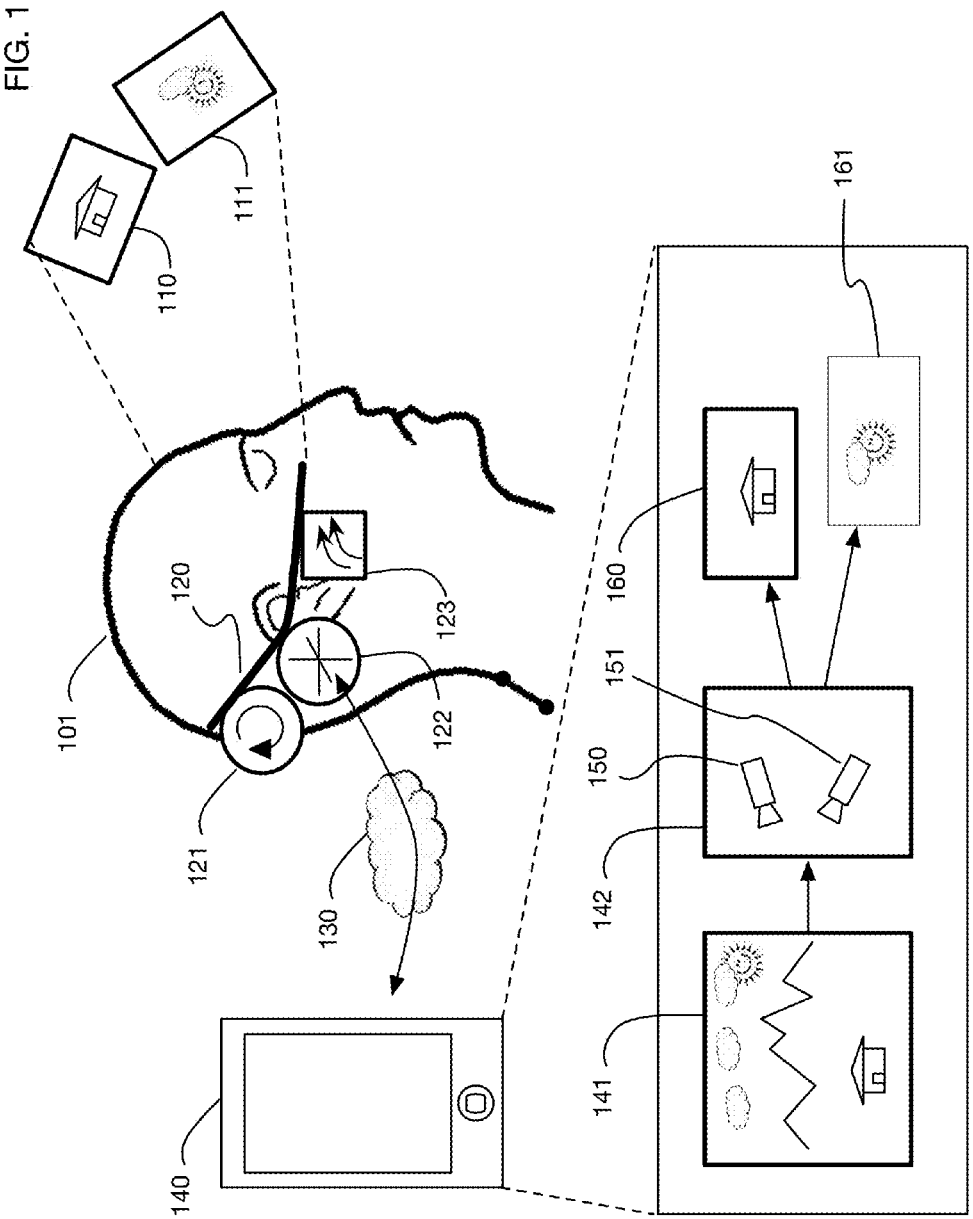
FIG. 1 illustrates the key components of at least one embodiment of low-latency virtual reality display system, configured for illustration with displays, sensors, and some processing modules embedded in virtual reality goggles, and rendering performed by a wirelessly connected mobile device.

FIG. 1 shows a high-level schematic diagram of an embodiment of the invention that embeds elements of the system into virtual reality goggles. Other embodiments may embed elements of the system into any other devices wearable by or viewable by one or more users. For example, without limitation, one or more embodiments may embed elements of the system into goggles, glasses, sunglasses, monocles, helmets, visors, binoculars, contact lenses, or ocular implants. Some embodiments may not be worn by users, but may be placed on walls, in televisions, in mirrors, on ceilings or floors, inside flight simulators or other simulators, in windshields, in windows, or in or on any other location where a virtual reality experience is desired.

In FIG. 1, user 101 wears a head-mounted device 120 that incorporates several elements of the embodiment shown. Displays 110 and 111 are in front of the user's left and right eyes, respectively. These displays are shown offset from user 101 for exposition; in reality many embodiments may position displays of head-mounted devices directly in front of the user's eyes. While the embodiment shown has two displays—one for each eye—embodiments may use any number of displays, including for example only a single display, or two displays as shown in FIG. 1, or more than two displays. In FIG. 1, the images shown on displays 110 and 111 are different; this may be useful in one or more embodiment for example to provide a stereoscopic 3D display. One or more embodiments may use the same image for multiple displays.

Device 120 includes a sensor (or multiple sensors 121). Sensor 121 measures some aspect of the position or orientation of user 101, or of changes thereto. The position and orientation of an object in three-dimensional space is referred to in the art as the "pose" of that object. Hence sensor 121 is a type of pose sensor. One or more embodiments may measure any desired aspects of the pose of any body parts of user 101. For example, in some embodiments sensor 121 may measure the pose of the user's head. In some embodiments sensor 121 may measure the pose of one or more of the user's eyes. Combinations of pose measurements for different body parts may also be used in one or more embodiments. Examples of sensors that may be used in one or more embodiments include, without limitation, accelerometers, gyroscopes, GPS trackers, ultrasonic rangefinders, pressure sensors, video cameras, altimeters, radars, sonars, magnetometers, flow meters, Doppler shift meters, or tilt sensors. Embodiments of the system may use only a single sensor, or multiple sensors. Some embodiments may use one or more sensors that directly measure some aspect of the pose of a body part of the user; for example, a magnetometer may provide partial orientation information directly. Some embodiments may use one or more sensors that indirectly measure pose; for example, a gyroscope may measure angular velocity, which must be integrated to yield orientation. The schematic of FIG. 1 shows sensor 121 located near the back of the head of user 101; this location is arbitrary and may vary in different embodiments of the invention. For example, an embodiment that uses a video camera eye tracker to measure the orientation of a user's eye may be mounted near the user's eyes. One or more embodiments may use multiple sensors at different locations of a user's body. One or more embodiments may use sensors that are not mounted on the user's body at all, but that measure some aspect of the pose of a user or one or more of the user's body parts. For example, one or more embodiments may use video cameras located near the user, and may analyze images from these cameras to determine the user's pose.

In FIG. 1, device 120 also includes pose analyzer 122. This element receives sensor data from the sensor or sensors 121, and uses this data to calculate the pose of one or more body parts of user 101. The calculations made by pose analyzer 122 will in general depend on the type of sensor or sensors 121. For example, one or more embodiments may use inertial sensors for the sensors 121, in which case the pose analyzer 122 may execute an inertial tracking algorithm to estimate the position and orientation of the user. Such inertial tracking algorithms are well known in the art. Embodiments may use any methodology to translate the raw sensor data into pose information. One or more embodiments may use more than one pose analyzer; for example, an embodiment with eye tracking sensors may use a separate pose analyzer for each eye. While FIG. 1 illustrates an embodiment with pose analyzer 122 mounted on device 120 that is attached to the user, embodiments may use pose analyzers that are not attached to the user, or may use a combination of pose analyzers on a user-mounted device and pose analyzers remote from the user.

In general a virtual reality device generates virtual reality display images based on the user's pose. For example, as a user moves or turns, different images are displayed to simulate the real experience of viewing different parts of a scene. This functionality requires a 3D model of one or more scenes, and a rendering system that renders views of the scene based on the user's pose. In the embodiment shown in FIG. 1, the 3D scene model 141 and the scene renderer 142 are located in mobile device 140. This mobile device 140 communicates with the head-mounted device 120 over a wireless network 130. This separation of functionality between a head-mounted device and a remote device is only illustrative; embodiments may use any desired architecture to organize elements of the system into devices. For example, in one or more embodiments, all elements of the system may be incorporated into a device such as head-mounted device 120 that is worn by a user. In one or more embodiments, all of the elements of the system may be remote from the user: for example, the user's orientation may be detected by video cameras in a room, the pose analyzer and scene renderer may execute on computers in the room, and the rendered images may be displayed on monitors mounted on the walls of the room. In one or more embodiments, the system may be a distributed system with elements distributed over multiple nodes that communicate over a network; for example a 3D scene model may be hosted on a remote server, rendering may be done on a device that is local to the user but not attached to the user, and the sensors and displays may be on a user-mounted device. Embodiments may use any type of network communication between elements of the system, including wired or wireless networks, or combinations thereof. Any network media and network protocols may be used to communicate between elements of the system.

3D scene model 141 contains a 3D representation of the objects that may be displayed to the user; it is a model of the 3D "virtual world." This scene model may be static, or it may change over time. Dynamic 3D scene models may also change in response to user actions or to changes in user pose. The 3D scene model may include computer-generated elements, real scene data captured by cameras or 3D scanners, or combinations of computer-generated and real data. Embodiments may use any desired type of 3D scene model, and any desired data representation for the scene model such as for example, without limitation, VRML, X3D, OBJ, COLLADA, Blender, 3DS, or any other proprietary or open format for 3D information.

Scene renderer 142 generates one or more rendered 2D images from scene model 141. In one or more embodiments of the system, the scene render generates one or more "virtual cameras" based on the pose data received from pose analyzer 122. These virtual cameras have a location and orientation in the 3D space defined by the 3D scene model. In the embodiment shown in FIG. 1, scene renderer 142 generates two virtual cameras 150 and 151, each of which corresponds to one of the two displays 110 and 111. Embodiments may use any number of virtual cameras and associate these virtual cameras in any desired manner with displays. Rendering generates a 2D projection for each of the virtual cameras. Techniques for rendering 2D projections from 3D scenes are well known in the art, and these techniques are implemented in many readily available software libraries and graphics processing units. Embodiments may use any of the well known techniques, software packages, or devices for 3D rendering to generate 2D projections. In the embodiment illustrated in FIG. 1, virtual camera 150 generates 2D projection 160, and virtual camera 151 generates 2D projection 161. 2D projections 160 and 161 are transmitted back to device 120 over network 130. These projections may be displayed directly on displays 110 and 111.

In the embodiment shown in FIG. 1, device 120 includes image warper 123. The image warper provides a low-latency "rerendering" of the projections 160 and 161 for certain types of changes in the user's pose. Specifically, the image warper receives data on the virtual camera poses 150 and 151 that were used to generate projections 160 and 161. It also receives updates to the user's pose from pose analyzer 122. By comparing the user's new pose to the virtual camera poses used to render the 2D projections, the image warper calculates a change in pose. When a user's pose changes, the full rendering path to generate new 2D projections would require another iteration of the original rendering path: pose data would be sent to device 140, and converted to virtual camera poses 150 and 151; then scene renderer 142 would generate new 2D projections from 3D scene model 141, and transmit these new 2D projections back to device 120. This full rendering path may be relatively slow, leading to observable latency for the user. The function of the image warper is to reduce this latency by performing a rapid "rerendering approximation" that provides a relatively quick and efficient update to the images 110 and 111 based on changes to the pose. This rerendering approximation is not a complete rendering as would be performed by the scene renderer 142; instead it uses approximations to reduce the calculations and communications required to update the display, thereby reducing latency. Illustrative details of how various embodiments may perform image warping are provided below.

Figure 2:
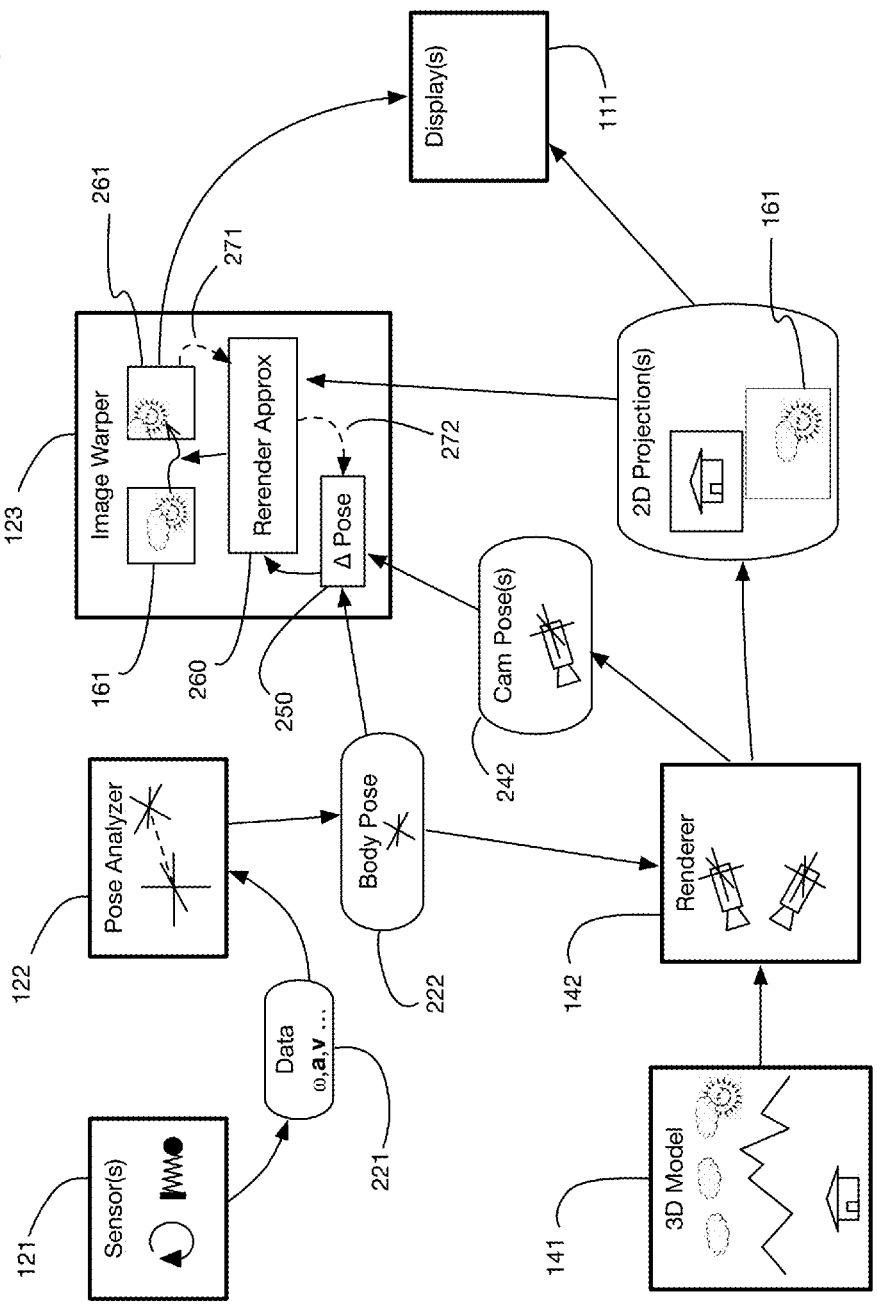
FIG. 2 shows a high-level architectural view of the embodiment shown in FIG. 1.

FIG. 2 shows a conceptual block diagram of the embodiment of FIG. 1, illustrating the main data paths. Sensor (or sensors) 121 generate sensor data 221. This sensor data may include, for example, angular velocity data, acceleration data, velocity data, or any other data generated by any of the types of sensors discussed above or any sensor that may measure any aspect of the pose of a user's body part. The sensor data 221 is sent to pose analyzer 122, which generates body pose 222 from the sensor data. Body pose 222 may include multiple poses, depending on the embodiment; for example in one or more embodiments with eye trackers, body pose 222 may have a separate pose for each of the user's eyes. Body pose 222 is sent to scene renderer 142, which takes 3D scene model 141, and renders one or more 2D projections such as 161. 2D projections 161 are sent to displays 111. The scene renderer 142 also generates virtual camera poses 242 for the virtual camera or virtual cameras used to generate the 2D projections. For some subsequent changes in pose, the new body pose 222 and the virtual camera pose 242 may be sent to image warper 123. Embodiments may use various techniques to determine when, whether, and how to use rerendering via the image warper vs. full rendering iterations via the scene renderer. Image warper 123 calculates a change in pose 250. The change in pose 250 and the original 2D projections 161 are sent to the rerendering approximation 260, which performs the image warper to transform 2D projection 161 into modified 2D projection 261, which is then sent to display 111. In some embodiments the rerendering approximation process may be repeated multiple times before another full rendering of the scene. Embodiments may employ various techniques for repeated rerendering approximations. In some embodiments for example the repeated rerendering may be "iterative": warped projection 261 may be sent back to the rerendering approximation 260 on path 271, for another iteration of warping when a new body pose 222 is available. In these iterative embodiments of repeated rerendering, the pose of the last warped image may also be provided on path 272 to the pose change calculation 250 so that pose changes represent only the change from the last warped image. In other embodiments the repeated rerendering may instead by "cumulative": original 2D projection 111 may be saved, and repeated rerendering approximations may be performed on the original projection rather than on the last warped image. Some embodiments may employ combinations of these iterative and cumulative rerendering approaches.

Figure 3:
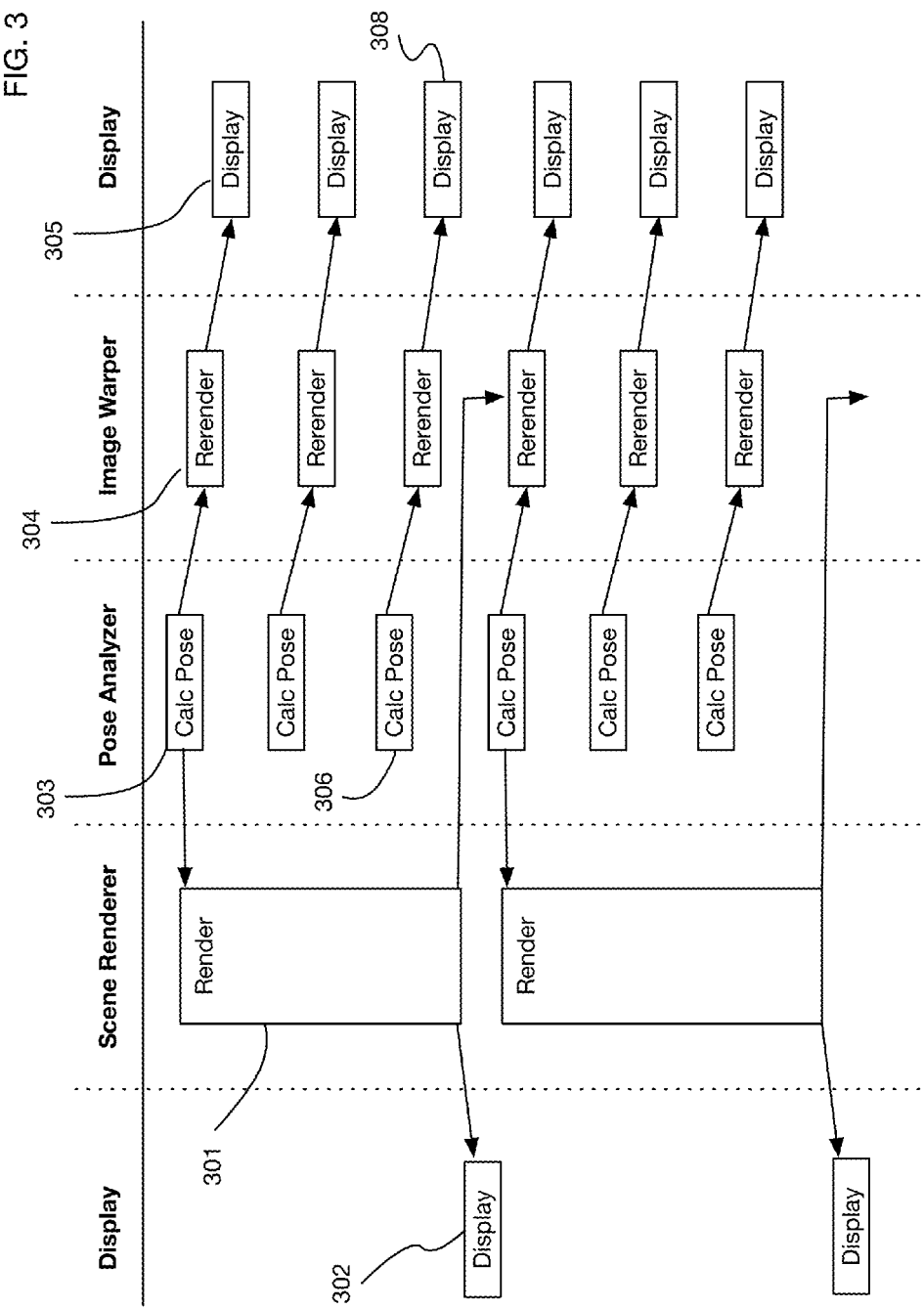
FIG. 3 shows a swimlane diagram for the major rendering activities of the embodiment shown in FIG. 2.

FIG. 3 shows an illustrative "swimlane" process timing diagram of some of the key steps described above. This diagram presumes that a 3D scene has been previously rendered and is currently displayed on the displays. Initially the Pose Analyzer calculates a pose at 303, and sends this pose to the Scene Renderer. The Scene Renderer launches a Render process 301 which is time-consuming. If the system waited for the Render process 301 to complete, the display would not be updated until the new display 302 is available. To provide a lower latency display that is responsive to user's movements, the Pose Analyzer sends the pose 303 to the Image Warper as well. The Image Warper executes a rapid Rerender process at 304 to modify the current display based on the change in pose. This Rerender process finishes quickly resulting in new display 305. This example illustrates how the Image Warper provides for a lower latency virtual reality display, by executing a fast, approximate rerendering to update a display rather than waiting for a time-consuming full rendering process.

In FIG. 3, this process of rerendering repeats a second time while the Render process 301 is calculating, and then a third time when pose calculation 306 is sent to the Image Warper for rerendering, to generate display 308. After Render 301 is complete, the new 2D projection is available for subsequent rerendering steps. In this illustrative embodiment, full Rendering 301 and approximate Rerendering 304 are interleaved. Some embodiments may employ different strategies to mix full rendering and approximate rerendering as desired. The timing shown in FIG. 3 of three approximate rerendering steps occurring while full rendering is executing is simply illustrative; embodiments may employ any desired or required frequency and timing of these steps based on latency requirements, processor capacity, and the types of rerendering approximations used.

Figure 4:
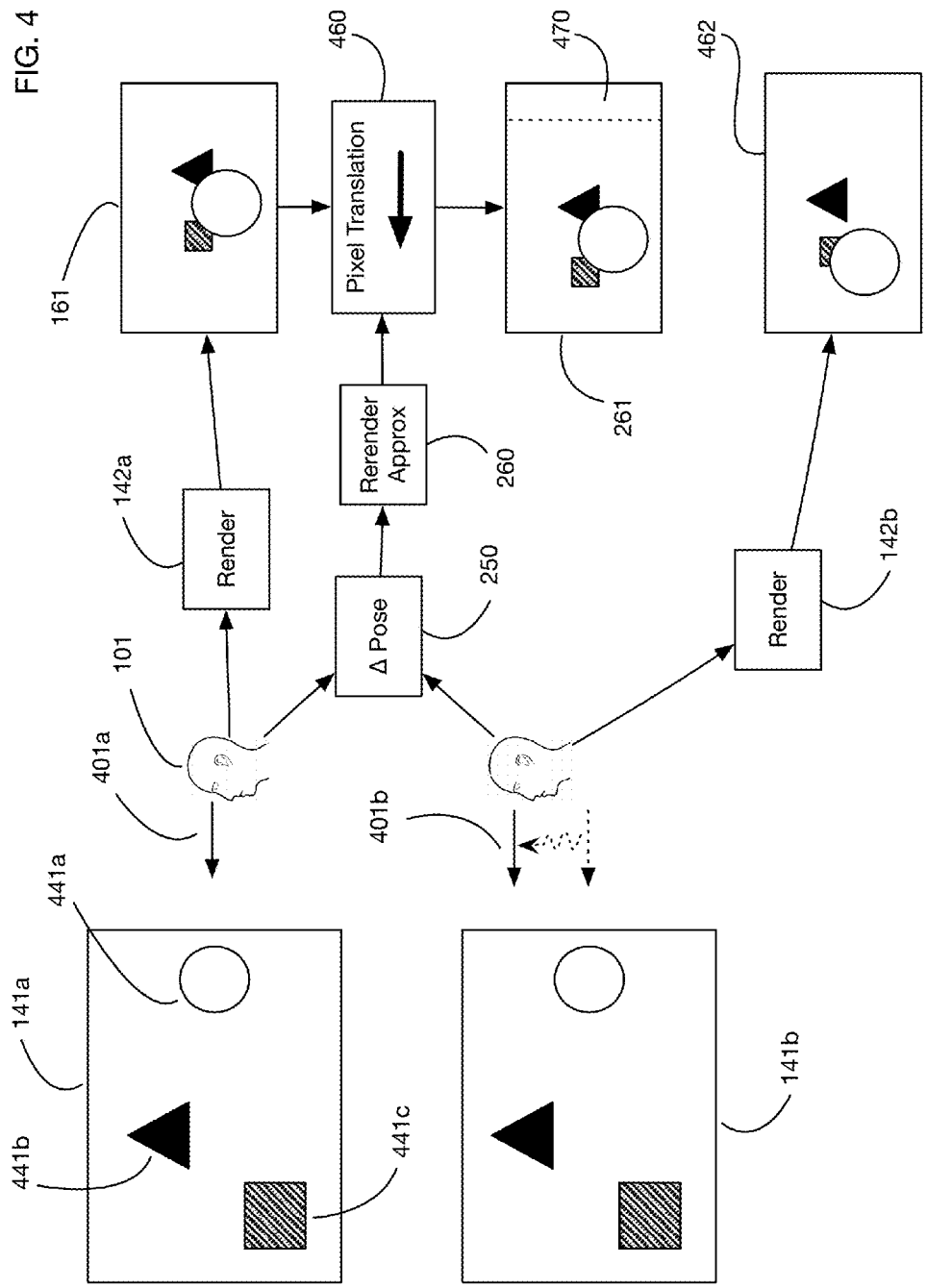
FIG. 4 illustrates an embodiment of the system that implements low-latency rerendering using a pixel translation.

Embodiments of the system may employ various types of approximate rerendering techniques to achieve the desired latency. In one or more embodiments, the approximate rerendering consists of or includes a pixel translation that simply shifts all pixels of the 2D projection by an appropriate pixel translation vector. One advantage of this approach is that pixel translation can be executed very rapidly; for example in some embodiments it may be achieved simply by modifying an offset address for the display memory used by a graphics processing unit. In some embodiments pixel translation may be supported directly by the display hardware. FIG. 4 illustrates an embodiment that uses a pixel translation vector for rerendering approximation. Initially user 101 has a pose indicated by view vector 401a. The user is observing 3D scene model 141a, which includes for illustration three objects: a sphere 441a, a pyramid 441b, and a box 441c. (These objects are illustrated in two dimensions in FIG. 4 for simplicity, but in general the 3D scene models may contain three dimensional shapes.) The objects are located at different distances from the user 101, with 441a closest and 441c furthest away. The render process 142a generates 2D projection 161. As illustrated in 161, the rendering process shows the depth of the various objects, with the sphere 441 appearing largest since it is closest to the user. The rendering process also reflects occlusion of objects; since sphere 441a is in front, it partially obscures objects 441b and 441c.

After this initial rendering, user 101 moves to the right, with new view vector 401b. The new pose of the user (which reflects the new view vector) is compared to the original pose with the pose change comparator 250. This pose change is sent to the approximate rerender 260, which calculates a pixel translation vector 460 that approximates the change to the 2D projection based on the user's movement. Since the user moved to the right, the pixel translation vector is a shift of pixels leftwards. Applying the pixel translation vector 460 to the original 2D projection 161 results in modified image 261. All pixels in the scene are shifted left by the same amount.

FIG. 4 also illustrates how the rerendering approximation differs from a full rendering based on the new pose. If the new pose 401b is sent to the Scene Rendering process 142b, the resulting 2D projection is 462. This new 2D projection is a fully accurate representation of the user's new view. For example, in the updated 2D projection 462, the sphere 441 shifts leftward more than the box 441c, since it is closer to the user. Because the rendering process 142b takes the depth of the objects into account in rendering the scene, these relative shifts are correctly rendered. In contrast, the approximate rerendering 260 via pixel translation vector 460 captures the basic movement of the scene—the user moves right so the pixels shift left—but it is nevertheless an approximation that does not take into account the 3D scene model. The advantage of the approximate rerendering is that it can be performed very quickly, particularly with pixel translations, resulting in low latency display that is very responsive to the user's movements. Different embodiments of the system may mix full rendering and approximate rerendering as needed or desired to make the appropriate tradeoffs between accuracy and low latency based on the application.

Figure 4A:
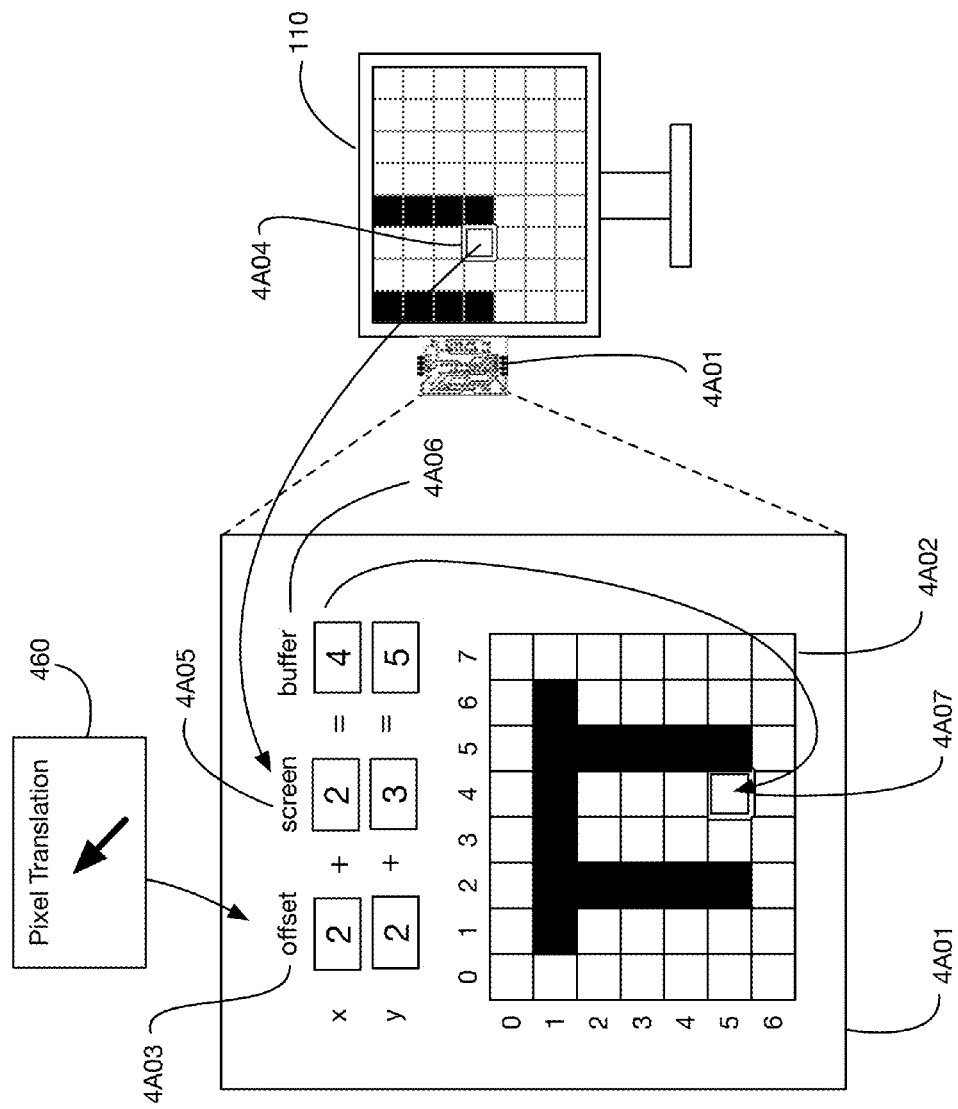
FIG. 4A illustrates an embodiment of the system that uses hardware accelerated rerendering using offset registers for reading frame buffer memory.

One or more embodiments of the system may use hardware acceleration to modify the pixels of a display to perform pixel translations or other image warping operations. FIG. 4A illustrates an example of an embodiment with hardware support for pixel translation in the monitor hardware. In some embodiments hardware support may be provided in graphics processing units or in other system components as well. In FIG. 4A, monitor 110 includes hardware 4A01 that drives the monitor output. This hardware has direct support for implementing pixel translation 460. The monitor hardware includes a frame buffer 4A02 that stores pixel values. To display the pixel value at a screen address 4A05, corresponding for example to pixel 4A04 on the display 110, the hardware adds offsets 4A03 to the screen address 4A05 to obtain a frame buffer address 4A06, which in this example points to frame buffer pixel 4A07. The offset 4A03 is set based on pixel translation 460. Changes to the pixel translation can be rerendered very quickly by the display hardware by updating the offset 4A03. In one or more embodiments the display hardware may provide support for additional image warping features, such as for example filling of holes with interpolated pixel values, blurring of edge regions, rotations in addition to translations, or any other desired warping transformations. One or more embodiments may provide hardware acceleration in other system components instead of or in addition to in display hardware, such as for example in graphics processing units or in coprocessors.

Figure 5:
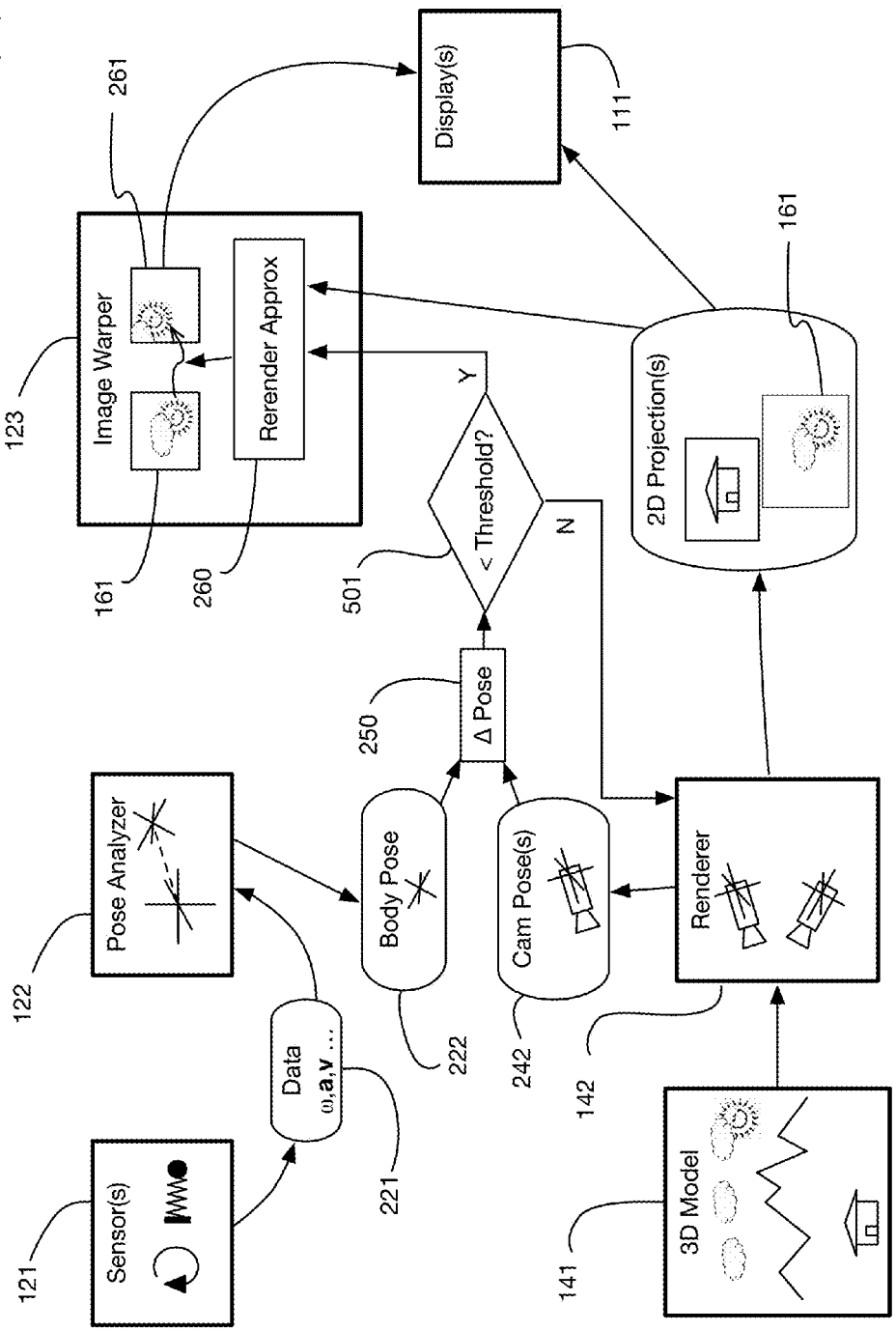
FIG. 5 illustrates an embodiment of the system that executes low-latency rerendering if the changes in a user's pose are below a threshold value.

In one or more embodiments, approximate rerendering may be used only when a user makes relatively small changes in pose. In some cases the accuracy of approximate rerendering may be very good for small changes in pose, but it may be poorer for large changes in pose. Therefore limiting approximate rerendering to small changes in pose may be appropriate in some embodiments. FIG. 5 illustrates an embodiment that employs this strategy. The virtual camera pose 242 used to generate a previous 2D projection is compared to a user's current pose 222 to generate a change in pose 250. This change in pose is compared at 501 to a threshold. If the change in pose is below a threshold, rerendering approximation 260 is executed for a low latency update to the display; otherwise a full rendering 142 is executed to generate new 2D projections 161. Embodiments may use various methods to compare pose changes to threshold values. For example, for pose changes that are translations, the distance moved by the user may be a metric that is compared to a threshold value. For pose changes that are rotations, the angle of rotation may be a metric that is compared to a threshold value. For pose changes that combine translations and rotations, weighted sums of translation distance and angular change may be compared to a threshold, or translations and angle changes may each be employed to respective thresholds. These examples are illustrative; embodiments may use any desired function to compare pose changes to any threshold value or values to decide when to execute approximate rerendering.

Figure 6:
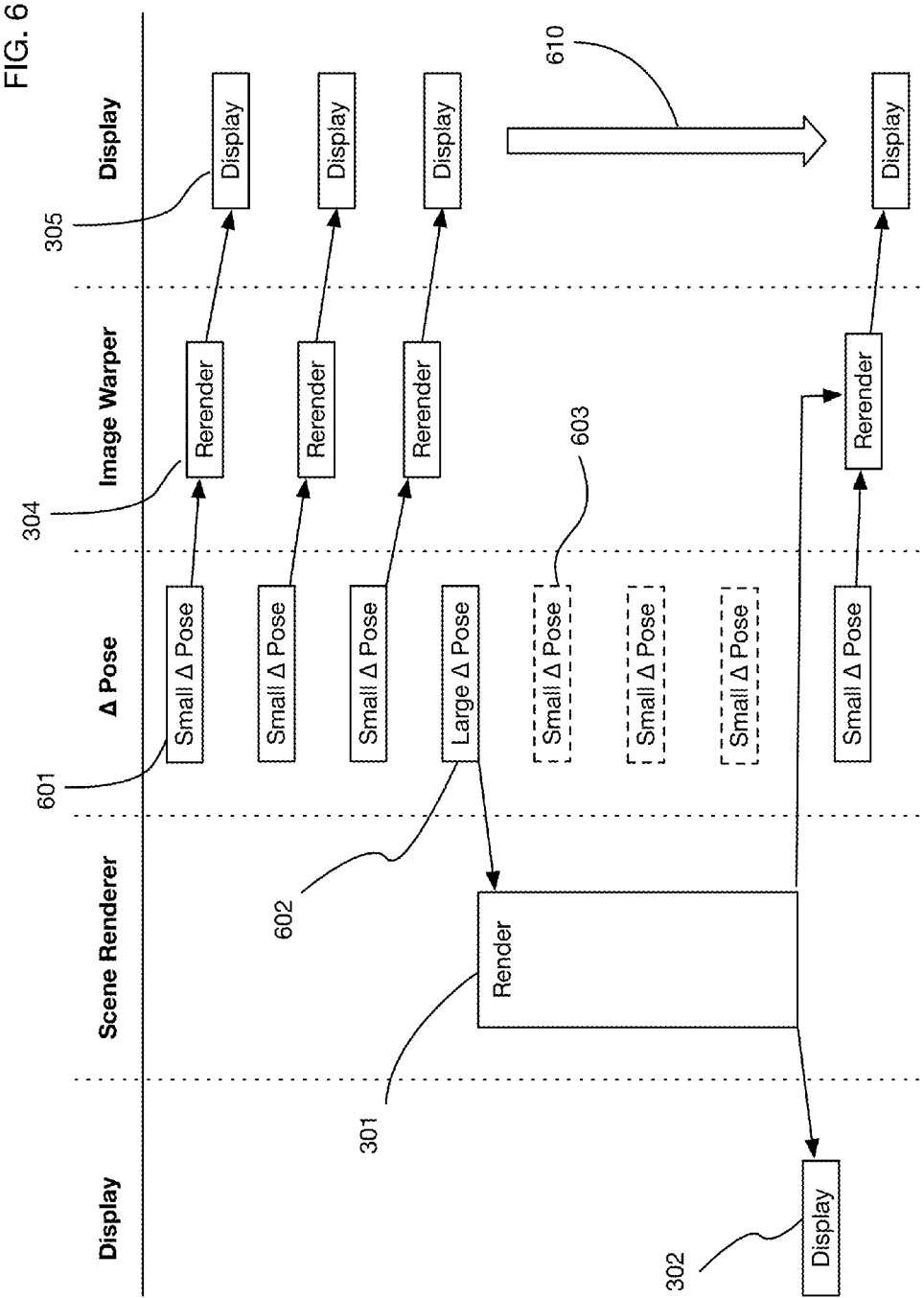
FIG. 6 shows a swimlane diagram for the major rendering activities of the embodiment shown in FIG. 5.

FIG. 6 shows an illustrative swimlane timing diagram for the embodiment shown in FIG. 5 that compares pose changes to a threshold. Pose change 601 is determined to be a small change since it is below the threshold value. Therefore the rerendering approximation 304 is executed to generate display 304. Similarly the next 2 pose changes are small, and rerendering approximations are executed. Afterwards pose change 602 is determined to be large (greater than the threshold); therefore a full rendering operation 301 is initiated. In this illustrative embodiment, the system pauses display updates during time 610 while the rendering process 301 is executing. Thus the next update to the display 302 occurs when rendering 301 is complete.

In some embodiments, naïve parallel interleaving of full rendering and approximate rerendering may result in display updates that appear to be out of sequence. Returning to FIG. 3, the three approximate rerendering steps beginning at 304 execute in parallel with the full rendering process 301. While this parallelism achieves low-latency update of displays (for example at 306 and 308), it may result in timing artifacts that negatively affect the user's experience. For example, the user observes display update 308, which is based on the user's pose 306. Immediately afterwards, the user observes display update 302, which is based on the user's pose 303. Thus the display at 302 may appear to the user to go backwards relative to the most recent display 308 which was generated by a rerendering approximation. For very small changes in pose these artifacts may not be noticeable, but in some embodiments they may compromise the virtual reality experience.

One solution to these timing artifacts is to prevent parallel execution of full rendering and approximate rerendering altogether. Such an embodiment is illustrated in FIG. 6. In this embodiment, approximate rerendering occurs for small pose changes, and full rendering occurs for large pose changes. Moreover, approximate rerendering is paused during full rendering. Thus the user never observes the timing issues that may be visible for example in FIG. 3. However, the embodiment illustrated in FIG. 6 achieves this consistency at the expense of latency: for example the delay 610 in display updates during rendering 301 may be perceived by the user as a lack of responsiveness of the system.

Figure 7:
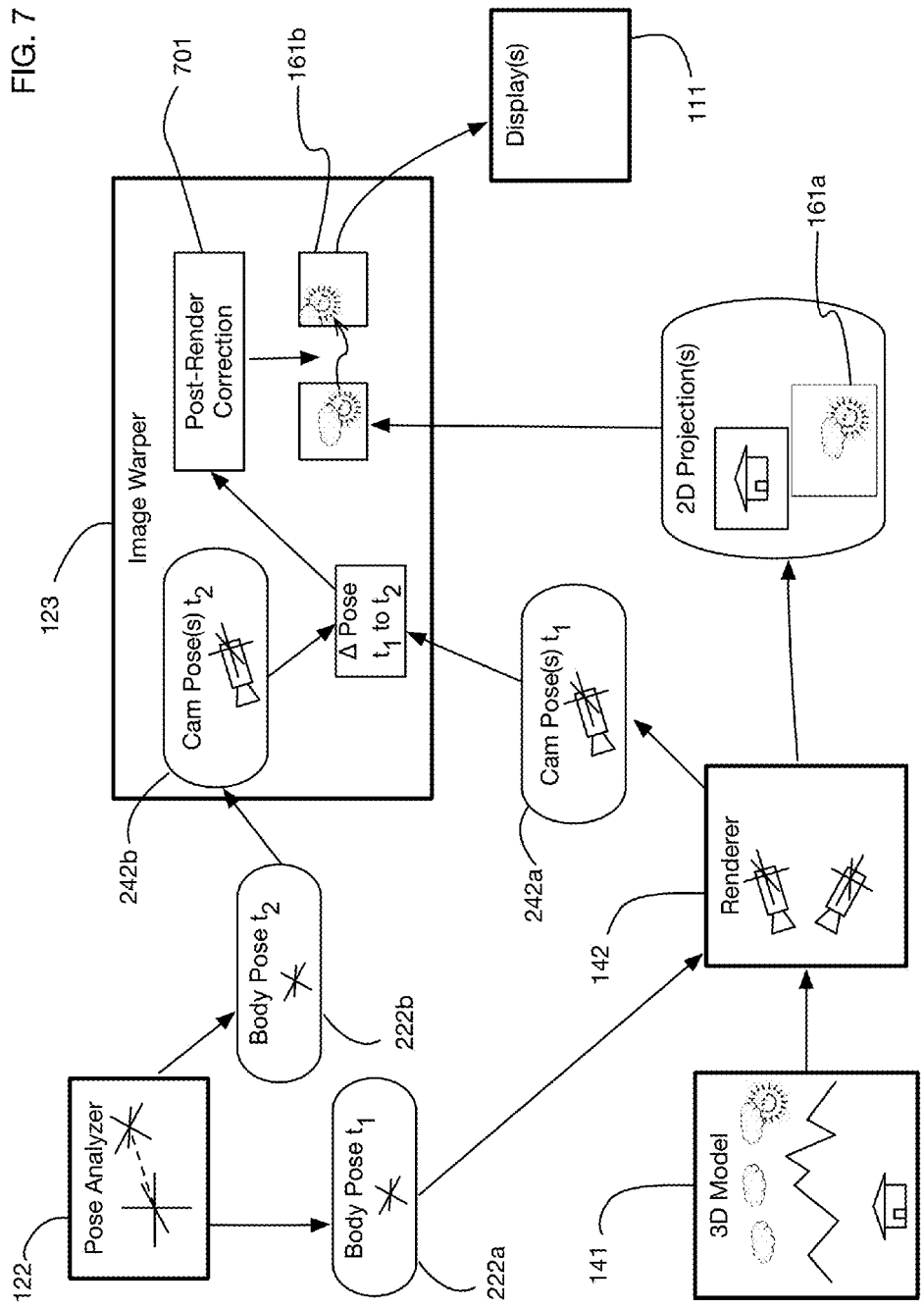
FIG. 7 illustrates an embodiment of the system that performs a post-rendering modification to rendered scenes using a low-latency correction for recent changes in the user's pose.
Figure 8:
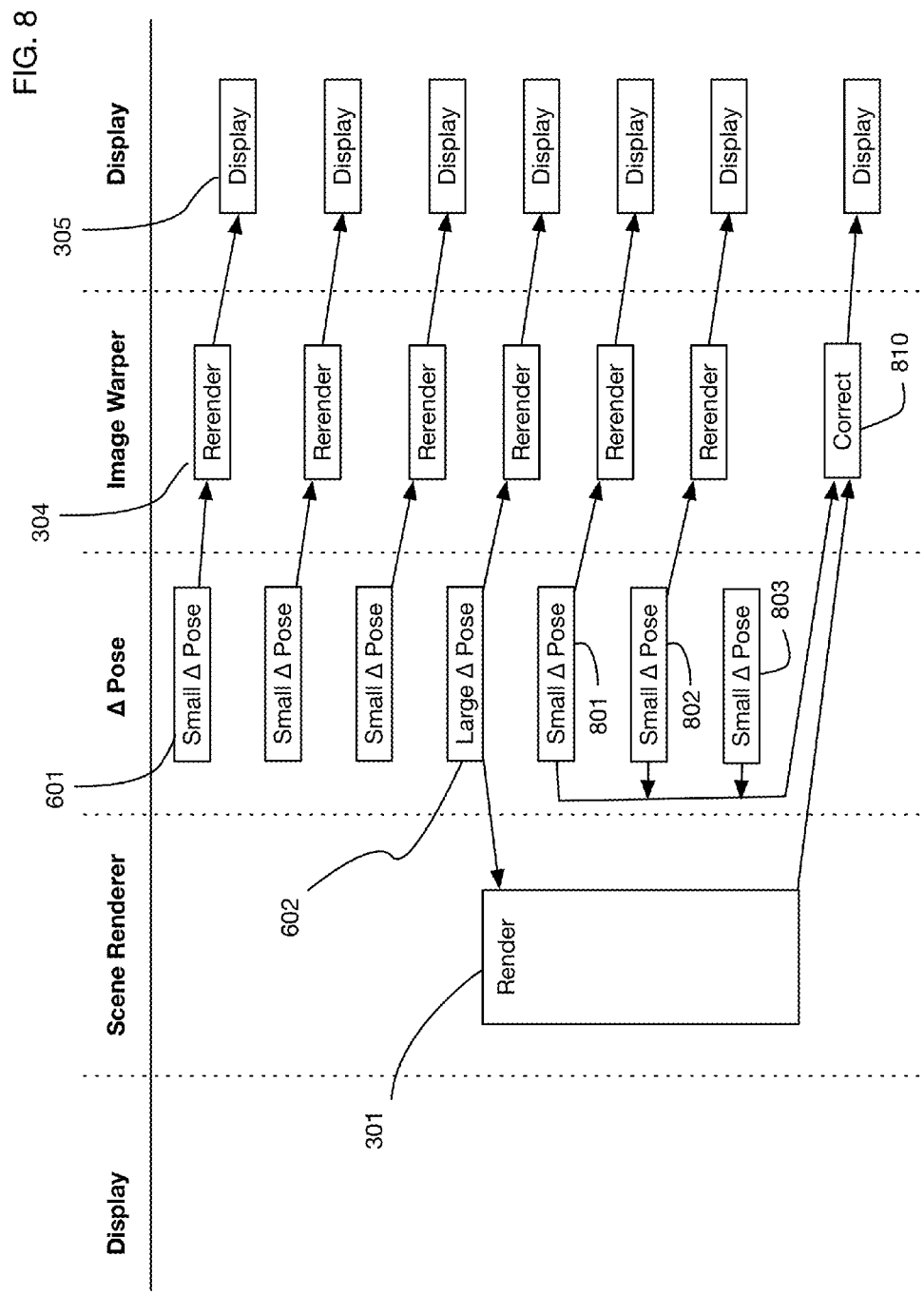
FIG. 8 shows a swimlane diagram for the major rendering activities of the embodiment shown in FIG. 7.

Embodiments of the system may employ a more sophisticated interleaving strategy that achieves consistently low latency without introducing the types of timing artifacts illustrated in FIG. 3. These embodiments generate full rendering in parallel with approximate rerendering, and in addition they perform post-rendering corrections on the fully rendered images to synchronize them with updates that have occurred since the full rendering process began. FIG. 7 illustrates an embodiment that applies post-rendering corrections, and FIG. 8 shows an associated swimlane diagram for the key processing steps. Turning first to FIG. 8, in this illustrative embodiment, small changes in pose generate approximate rerendering, and large changes in pose generate full rendering. For example, pose change 601 is small (compared to a designated threshold value); hence approximate rerendering 304 is executed to generate display update 305, with relatively low latency. Similarly the subsequent two pose changes are small and generate approximate rerendering. Pose change 602 is large; hence the system initiates full rendering 301 which is based on the pose at 602. Because rendering 301 is time-consuming, pose changes 801, 802, and 803 are received during rendering 301. Since each of 801, 802, and 803 are small changes, rerendering approximations are performed to generate display updates for each of these pose changes. After rendering 301 completes, instead of displaying the output of 301 directly, the output of 301 is corrected by process 801 before it is displayed. The correction 810 uses the cumulative pose changes 801, 802, and 803 that occurred after the initiation of 301 to synchronize the display with the most recent pose.

FIG. 7 shows a block diagram of an embodiment that implements the process illustrated in FIG. 8. At time $t_1$ pose 222a is sent to renderer 142. Eventually the renderer generates 2D projection 161a; this projection was based on virtual camera pose 242a, which corresponds to pose 222a at time $t_1$. One or more pose updates have been received and processed between time $t_1$ and the availability of 2D projection 161a; the most recent such update is body pose 222b received at time $t_2$. Therefore the 2D projection 161a is not sent directly to display 111. Instead it is sent to image warper 123, which will correct it for pose changes that have occurred since the beginning of the rendering process. Image warper 123 calculates virtual camera pose 242b corresponding to the most recent body pose 222b, and compares it to the virtual camera pose 242a used for rendering projection 161a. The difference in these virtual camera poses is applied to post rendering correction 701, which modifies 2D projection 161a based on recent pose changes to generate corrected 2D projection 161b, which is sent to display 111. One potential benefit of such an embodiment is that displayed images will reflect the most recent pose data received from the sensors. Another potential benefit is that approximate rerendering may be interleaved in parallel with full rendering for improved latency without introducing timing artifacts.

Approximate rerendering and post rendering correction may significantly reduce the latency between changes in pose and updates to the display that reflect these changes. However, the processes of measuring pose, generating an approximate rerendering, and transferring data to the display, continue to introduce some latency even when these improvements are in place. FIG. 8A illustrates this potential issue. A pose measurement starts at time 8A01 ($t_1$). After pose measurement completes, a rerendering approximation is calculated and transferred to the display; the display update competes at time 8A02 ($t_2$). Although a long-latency full rendering is avoided, there remains elapsed time 8A03 ($\Delta t$) between the start of pose measurement and the completing of the display update. The display update therefore lags the true pose by this amount $\Delta t$.

One or more embodiments may employ pose prediction to further reduce this latency. An example of this approach is illustrated in the lower half of FIG. 8A. A pose measurement 8A05 occurs with resulting pose $Q_1$. Instead of passing this pose $Q_1$ directly to the image warper, the system uses the known delay 8A03 ($\Delta t$) between pose measurement and display to predict what the pose will be at the time 8A30 that the display update will complete. In this illustrative embodiment, an extrapolation of pose changes is made using the previous pose sample 8A04, which measured pose $Q_0$. Assuming sampling interval $\Delta s$ between pose measurements, a pose predication 8A06 is calculated as $Q_2=(Q_1 Q_0^{-1})^{(\Delta t/\Delta s)} Q_1$. This calculation considers poses to be rigid body transformations of three-dimensional space, with multiplication used to represent composition of these transformations. The predicted pose 8A20 ($Q_2$) is provided to the image warper for the rerendering approximation. Thus the display process which completes at time 8A30 is synchronized with the time of the predicted pose used to generate the display.

This pose prediction calculation 8A06 is an illustrative example; one or more embodiments may use any method to predict a future pose based on one or more previous pose samples and on any other available information. Any method of predicting a future trajectory for the location or orientation of any body part may be used by one or more embodiments. Prediction methods used by one or more embodiments may also for example take into account known constraints on the motion of the user. One or more embodiments may use adaptive pose prediction techniques that monitor the user's movements over time to predict the most likely subsequent movements based on previous movements.

FIG. 8A illustrates the use of pose prediction for image warping. One or more embodiments may use similar pose prediction techniques for full rendering as well. The discussion above for pose prediction for image warping applies to full rendering as well. One or more embodiments may generate a predicted pose that is sent to the full rendering process, where the predicted pose takes into account expected pose changes between the time of the pose measurement and the completion of the display update after full rendering. One or more embodiments may use pose prediction techniques for either or both of image warping and full rendering.

In some embodiments the approximate rerendering transformations applied by the image warper may result in "holes" in the transformed images with missing pixels. For example, returning to the embodiment illustrated in FIG. 4, the image warper shifts pixels to the left via pixel translation vector 460. This results in a "hole" 470 on the right edge of transformed image 261 that is missing pixels. Embodiments may employ various strategies or combinations of strategies to handle these holes. A very simple strategy employed by one or more embodiments is to fill holes with a relatively "neutral" background color; in some applications this may provide sufficient realism for small pose changes. However in other applications this simple approach may not be sufficient.

One or more embodiments may fill holes by rendering 2D projections that are larger than the displays. In these embodiments warping of the larger 2D projection may result in an updated projection that still fits entirely within the display area. FIG. 9 illustrates an embodiment that employs this strategy. In this embodiment, the scene renderer generates an extended 2D projection 901 from 3D model 141; this extended projection is larger than the display area. The displayed image 161 is a subset of the rendered area 901. For illustration we show the effect of an image warper 123 that applies a rightward pixel translation to the image. An embodiment that did not employ a hole-filling strategy would generate transformed image 111a, which has missing pixels in region 911 on the left edge of the display. In the embodiment of FIG. 9, the pixels of the extended rendered projection 901 are saved in an offscreen cache. The image warper then pulls pixels from this offscreen cache as needed to fill holes generated by the warping. In FIG. 9, pixels from the mountain object 920 are pulled from the offscreen cache to fill hole 911, resulting in an improved rerendered projection with object 921 filling the hole. Embodiments may use any desired size and shape for the offscreen pixel cache.

Figure 10:
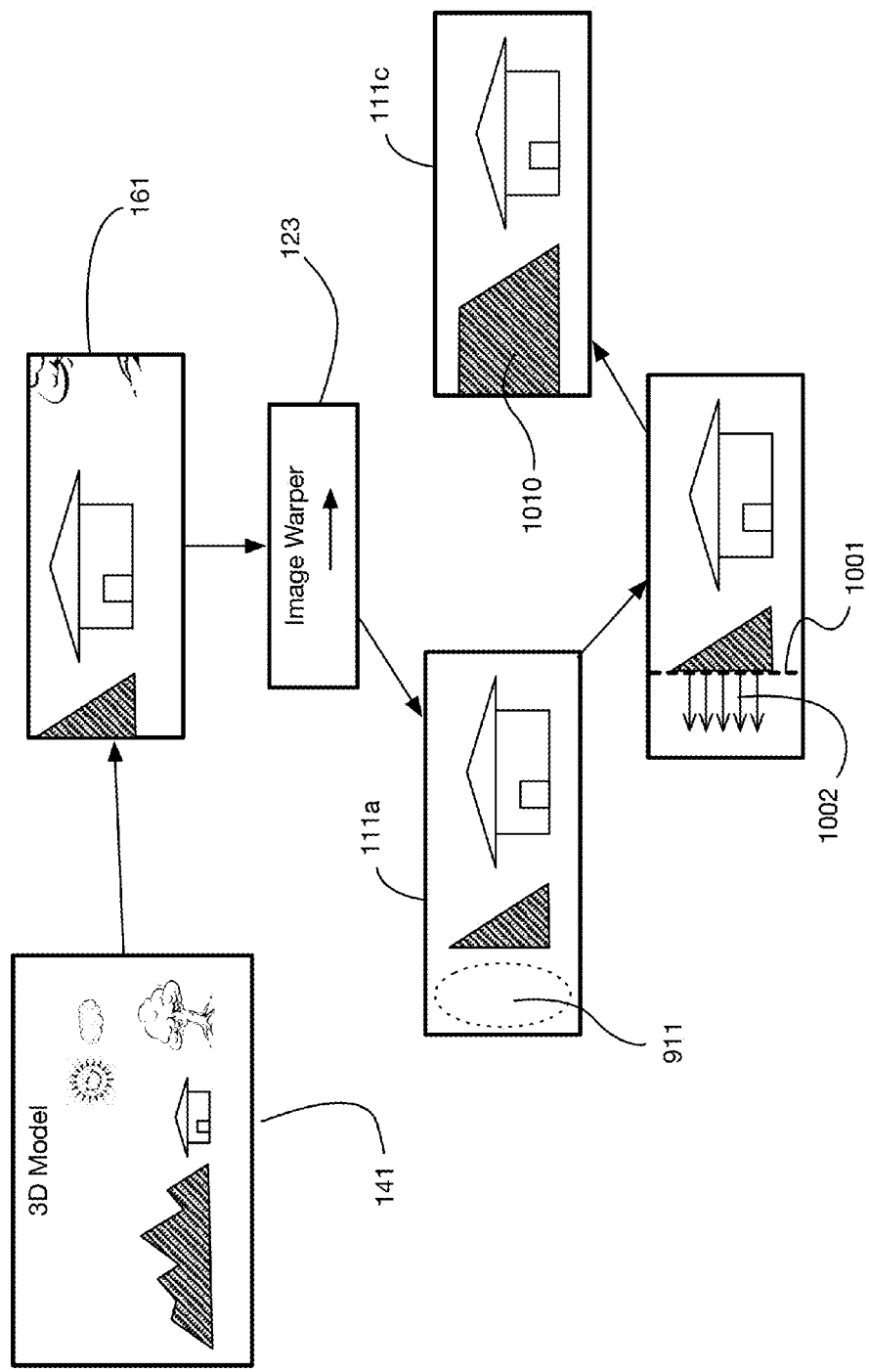
FIG. 10 illustrates an embodiment of the system that fills holes generated by low-latency rerendering transformations by extending pixels from the image boundary.

One potential drawback of the strategy of generated an extended rendered area is that it requires additional processing for the rendering of more pixels; thus it may exacerbate latency issues due to rendering delays. One or more embodiments may employ a hole-filling strategy that instead generates pixel values for the missing pixels based on some features of the warped image. For example, the embodiment of the system illustrated in FIG. 10 fills in pixel values by propagating pixels outward from the boundaries of the warped image into the regions with holes. For illustration, image warper 123 shifts pixels of 2D projection 161 to the right, resulting in hole 911 that is missing pixels. In this embodiment, the image warper finds the boundary 1001 that corresponds to the original left edge of projection 161; it then propagates pixel values from this boundary to the left with propagation 1002. This pixel propagation results in filled region 1010 rather than the hole 911. In this illustrative embodiment, the resulting image 111c has no noticeable hole; however the resulting shape of the mountainous area does not correspond precisely to the shape in the original 3D scene model 141. Nevertheless this simple strategy of propagating pixels from the boundary may provide adequate realism in some applications. One or more embodiments may employ other strategies to approximate pixel values in holes; for example one or more embodiments may locate a series of pixels in the warped image that are relatively close to the location of a missing pixel, and interpolate these pixel values to fill the hole.

Figure 11:
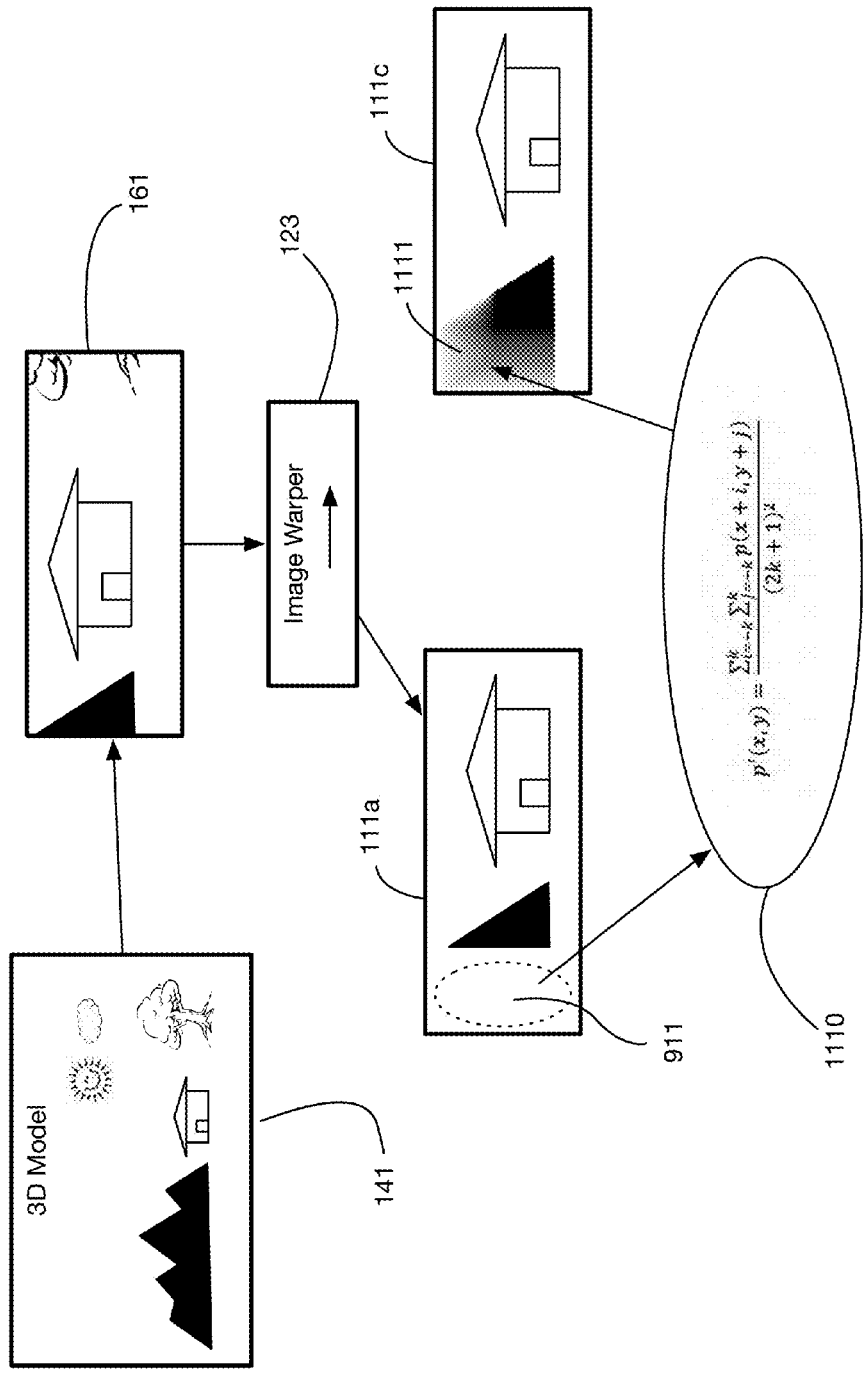
FIG. 11 illustrates an embodiment of the system that fills holes generated by low-latency rerendering transformations by blurring pixels near the image boundary.

Because pixel-filling approaches that propagate pixels from boundaries (or use similar heuristics) result in regions on the edges of displays that are not entirely faithful to the original 3D scene model, one or more embodiments may employ various blurring approaches to make these regions appear less sharp. By blurring the filled in regions, the approximate pixel values may be less noticeable to the viewer. FIG. 11 illustrates an embodiment that utilizes such a blurring. As before, the image warper shifts pixels to the right, resulting in hole 911 in warped image 111a. Then blurring transformation 1110 is applied to the pixels in hole 911. The illustrative blurring transform 1110 simply averages pixel values across a square region center centered at the coordinates of each missing pixel. The resulting blurred region 1111 in 111c has no obvious hole with missing pixel values; moreover the blurring has no obvious artifacts like the flat mountaintop showing in FIG. 10, region 1010. The blurring transformation 1110 which averages values in a local neighborhood is simply illustrative; embodiments may employ any desired transformation on the pixels of regions with holes, or on any pixels near to these regions, to achieve a desired blurring effect. For example, instead of a simple averaging, a Gaussian blur filter may be employed by one or more embodiments.

Figure 12:
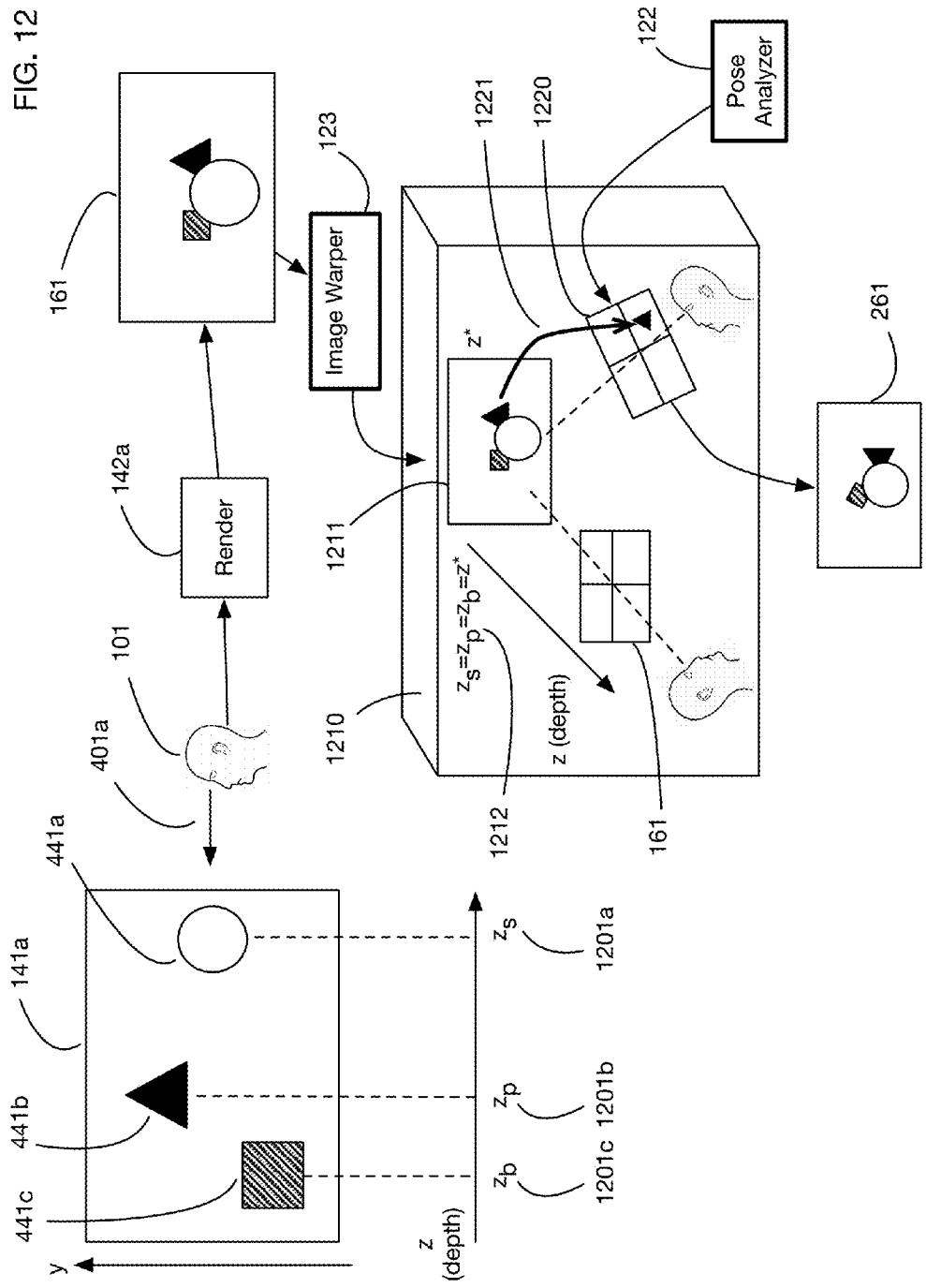
FIG. 12 illustrates an embodiment of the system that generates a low-latency rerendering transformation by projecting the rendered image onto a plane, and then rerendering onto a modified image plane corresponding the user's modified pose.

We now discuss illustrative approaches for image warping transformations. These transformations are rerendering approximations, rather than full rendering from the 3D scene model. In one or more embodiments, a rerendering approximation is generated by first creating a simplified 3D model from the 2D projections, and then reprojecting this simplified 3D model onto new view planes based on user's modified pose. For example, a simplified 3D model may be formed by mapping the 2D projections generated by the renderer onto one or more surfaces in 3D space. FIG. 12 illustrates an embodiment of the system that uses this approach for approximate rerendering. 3D scene model 141a consists of three objects: a sphere 441a close to user 101, a pyramid 441b further from the user, and a box 441c furthest from the user. FIG. 12 shows a two-dimension projection of the 3D scene model onto the y-z plane; here the z-axis points towards the user and the user is located at z=0 (a convention often used in 3D graphics applications), the y-axis points upwards, and the x-axis points towards the user's right. The sphere is at distance $z_s$ from the user; the pyramid is at distance $z_p$ from the user; and the box is at distance $z_b$ from the user. (These z-values are negative, in conformance with the orientation of the z-axis.) Scene renderer 142a generates 2D projection 161 of the 3D model. User 101 then changes pose, and image warper 123 performs a rerendering approximation to generate modified image 261. The rendering approximation first projects the 2D projection 161 onto plane 1211 in simplified 3D model 1210; this plane 1211 is at distance z* from the user. The value z* may be fixed, or it may be provided by the scene renderer 142a based on an average or typical distance of objects in the 3D model 141a from the user. In the simplified 3D model 1210 used by the image warper, all objects appear in 3D space at the same depth z* from the user, because all objects have been projected onto the single plane 1211 with depths 1212 of $z_s=z_p=z_b=z^*$. This does not match the actual depths 1201a, 1201b, and 1201c in the original 3D scene model 141a; hence the image warper is employing an approximate rerendering for efficiency, which simplifies the 3D rerendering model 1210 compared to the real 3D scene model 141a.

From the plane 1211 at depth z*, the image warper reprojects pixels onto modified view plane 1220 corresponding to the user's new pose. The orientation of plane 1220 is based on data received from pose analyzer 122. This reprojection generates modified image 261. In the illustrative example shown in FIG. 12, view plane 1220 is rotated clockwise compared to the initial view plane for image 161; hence the objects in 261 are rotated counterclockwise to form the rerendering approximation.

The embodiment illustrated in FIG. 12 generates a rerendering approximation by mapping the original 2D projection onto a single plane parallel to the user's original view plane, and then reprojecting that plane onto the user's modified view plane. One or more embodiments may map 2D projections onto other surfaces to perform approximate rerendering. For example, some embodiments may multiple portions of the 2D projections onto multiple planes. One or more embodiments may map 2D projections onto one or more curved surfaces, such as for example a sphere or a cylinder.

Mathematically, one or more embodiments may implement the rerendering approximation illustrated in FIG. 12 as follows. This implementation is illustrative only; embodiments may employ any desired transformations, algorithms, mappings, or image warpings to perform rerendering approximations. We assume for ease of illustration that a 2D projection is a rectangular image w pixels wide and h pixels high, and that the width w represents a horizontal field of view of f radians. We assume that the 2D projection was generated using a perspective projection transform of the 3D scene model onto view plane z=−1, followed by a scaling from spatial coordinates to pixel coordinates of $$s = w/2\tan\frac{f}{2}.$$

The view plane z=−1 is mapped onto plane z=−z* to form the 3D model for rerendering; thus point (x, y) of the view plane is mapped to coordinates (z*x, z*y, −z*). The subsequent change to the user's pose is modeled as a rigid body transformation T of the view plane, which in general consists of a rotation R of angle Δθ around unit vector axis $\hat{\omega}$ followed by a translation by vector Δr. Each point (z*x, z*y, −z*) is then projected onto this new view plane, and rescaled from spatial coordinates to pixel coordinates by the same scaling factor of $$s = w/2\tan\frac{f}{2},$$

to generate the rerendering approximation.

Derivation of the projection onto the new view plane may be simplified by recognizing that transforming the view plane by transformation T is equivalent to transforming the points on the plane z=−z* by $T^{-1}$, and then mapping these points to the original view plane z=−1. Mapping points to the view plane z=−1 is straightforward: point (x, y, z) maps to $$\left(-\frac{x}{z}, -\frac{y}{z}, -1\right).$$

Thus the rerendering approximation includes the following steps:

$$(x, y) \to (z^*x, z^*y, -z^*) =$$
$$(x_0, y_0, z_0) \to T^{-1}(x_0, y_0, z_0) = (x_1, y_1, z_1) \to \left(-\frac{x_1}{z_1}, -\frac{y_1}{z_1}\right) = (x', y')$$

Mapping $T^{-1}$ consists of a translation by vector $-\Delta r$ followed by a rotation R of angle $-\Delta\theta$ around unit vector axis $\hat{\omega}$. We now consider the case of small changes in the user's pose, where both $\Delta r$ and $\Delta\theta$ are small. In this case, rotation R can be approximated as $R \approx I+S(\hat{\omega})\Delta\theta$, where S is the cross-product matrix ($S(u)v=u\times v$), and I is the identity matrix. For small changes, the effects of translation and rotation are approximately additive; thus $T^{-1}r \approx r-\Delta r-(\hat{\omega}\times r)\Delta\theta$. Letting $\Delta r=(\Delta r_x, \Delta r_y, \Delta r_z)$ and $\hat{\omega}=(\omega_x, \omega_y, \omega_z)$ we have $T^{-1}(x_0, y_0, z_0)=(x_0-\Delta r_x-\omega_y z_0\Delta\theta+\omega_z y_0\Delta\theta, y_0-\Delta r_y+\omega_x z_0\Delta\theta-\omega_z x_0\Delta\theta, z_0-\Delta r_z-\omega_x y_0\Delta\theta+\omega_y x_0\Delta\theta)$. Thus $$x' = -\frac{x_0 - \Delta r_x - \omega_y z_0 \Delta\theta + \omega_z y_0 \Delta\theta}{z_0 - \Delta r_z - \omega_x y_0 \Delta\theta + \omega_y x_0 \Delta\theta} =$$

$$-\frac{z^*x - \Delta r_x + \omega_y z^* \Delta\theta + \omega_z z^* y \Delta\theta}{-z^* - \Delta r_z - \omega_x z^* y \Delta\theta + \omega_y z^* x \Delta\theta} = \frac{x - \frac{\Delta r_x}{z^*} + \omega_y \Delta\theta + \omega_z y \Delta\theta}{1 + \frac{\Delta r_z}{z^*} + \omega_x y \Delta\theta - \omega_y x \Delta\theta}$$

and $$y' = -\frac{y_0 - \Delta r_y - \omega_x z_0 \Delta\theta + \omega_z x_0 \Delta\theta}{z_0 - \Delta r_z - \omega_x y_0 \Delta\theta + \omega_y x_0 \Delta\theta} =$$

$$-\frac{z^*y - \Delta r_y + \omega_y z^* \Delta\theta + \omega_z z^* x \Delta\theta}{-z^* - \Delta r_z - \omega_x z^* y \Delta\theta + \omega_y z^* x \Delta\theta} = \frac{y - \frac{\Delta r_y}{z^*} + \omega_x \Delta\theta - \omega_z x \Delta\theta}{1 + \frac{\Delta r_z}{z^*} + \omega_x y \Delta\theta - \omega_y x \Delta\theta}$$

These expressions can be further simplified for the case of small x and y, which corresponds to pixels relatively near the center of the original 2D projection. Continuing to assume that both $\Delta r$ and $\Delta\theta$ are small, many of the terms above are second-order expressions, such as for example $y\Delta\theta$. Ignoring these second order terms, we have approximately:

$$x' \approx \frac{x - \frac{\Delta r_x}{z^*} + \omega_y \Delta\theta}{1 + \frac{\Delta r_z}{z^*}}$$

$$y' \approx \frac{y - \frac{\Delta r_y}{z^*} + \omega_x \Delta\theta}{1 + \frac{\Delta r_z}{z^*}}$$

Furthermore for small $\Delta r$ the denominator can be ignored to first order, since $$\frac{1}{1 + \Delta r_z/z^*} \approx 1 - \Delta r_z/z^*,$$

and the product of $\Delta r_z/z^*$ with the terms in the numerators consists of second order terms. Thus we can use the rerendering approximation:

$$x' \approx x - \frac{\Delta r_x}{z^*} + \omega_y \Delta\theta$$

$$y' \approx y - \frac{\Delta r_y}{z^*} + \omega_x \Delta\theta$$

Using this approximation, all coordinates (x, y) are therefore shifted uniformly by translation $$(\Delta x, \Delta y) = \left(-\frac{\Delta r_x}{z^*} + \omega_y \Delta\theta, -\frac{\Delta r_y}{z^*} - \omega_x \Delta\theta\right).$$

This formula provides the coordinate translation in spatial coordinates of the simplified 3D model. To convert to pixel coordinates, we simply apply the scaling factor $$s = w/2\tan\frac{f}{2}.$$

This yields the pixel translation vector ($s\Delta x$, $s\Delta y$).

This derivation shows that an approximate rerendering can be performed using a simple pixel translation vector which is based on a simplified 3D model, and which is a good approximation for small pose changes and for pixels near the center of a display. The derivation shown considers both rotational pose changes and translational pose changes. One or more embodiments may consider only rotational pose changes. These embodiments may for example use a pixel translation vector of ($s\Delta x$, $s\Delta y$)=($s\omega_y\Delta\theta$, $-s\omega_x\Delta\theta$), which uses only the rotational components of the pixel translation vector. One or more embodiments may consider only translational pose changes. These embodiments may for example use a pixel translation vector of $$(s\Delta x, s\Delta y) = \left(-\frac{s\Delta r_x}{z^*}, -\frac{s\Delta r_y}{z^*}\right),$$

which uses only the translational components of the pixel translation vector. One or more embodiments may consider both rotational pose changes and translational pose changes. These embodiments may for example use the complete pixel translation vector derived above of $$(s\Delta x, s\Delta y) = \left(-\frac{s\Delta r_x}{z^*}, +s\omega_y\Delta\theta, -s\omega_x\Delta\theta - \frac{s\Delta r_y}{z^*}\right).$$

The pixel translation vector approximation derived above is only one of many possible approximations to rerendering. One or more embodiments may use other approximations, or use the exact expressions derived above, to perform rerendering approximations.

Figure 13:
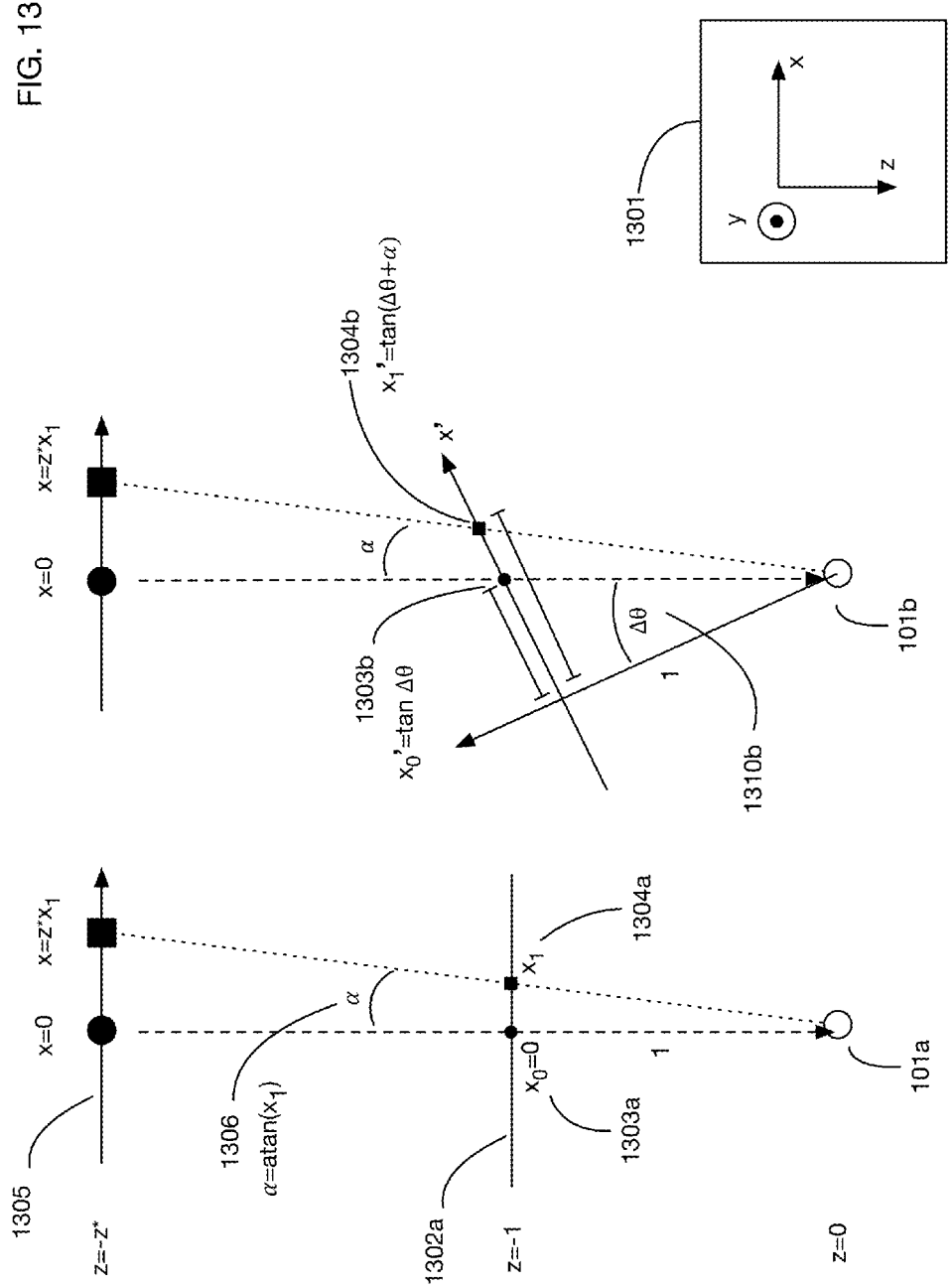
FIG. 13 shows a 2D model of an approximate rerendering calculation that generates a pixel translation vector from small angular rotations of a user's orientation.
Figure 14:
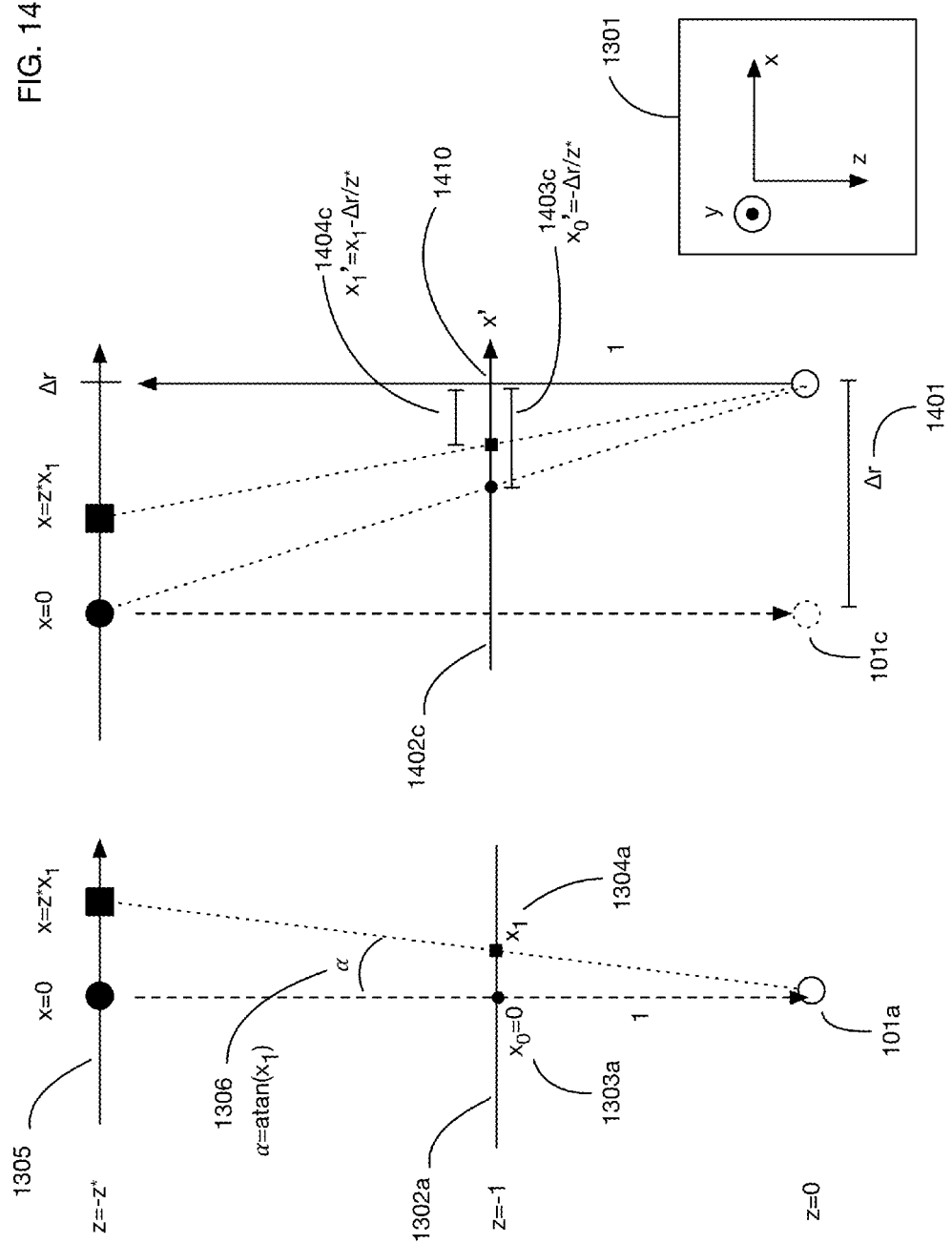
FIG. 14 shows a 2D model of an approximate rerendering calculation that generates a pixel translation vector from translations of a user's position.

Rerendering approximations using the above derived pixel translation vector are illustrated in FIGS. 13 and 14. FIG. 13 illustrates an example of a pose change consisting of a small angular rotation around the y axis. FIG. 13 shows a top view of the transformations, with the coordinate system 1301; the y axis points out of the page. Initially the user has pose 101a, and the 2D projection generated from the 3D scene model has a circle at x-coordinate 1303a (which is 0 since it is at the center of the display), and a square at x coordinate 1304a, which is at angle 1306 ($\alpha$). The rerendering approximation first maps these objects from the view plane 1302a onto plane 1305, located at distance $z^*$ from the user. The user then changes pose to 101b, by rotating the view vector clockwise around the y axis by angle $\Delta\theta$. The objects on plane 1305 are then reprojected on the new view plane. The circle, which was originally at $x_0=0$, has new x coordinate 1303b in the new view plane, with value $x'_0 = \tan \Delta\theta$. Since we presume that $\Delta\theta$ is small, $\tan \Delta\theta \approx \Delta\theta$. The square which was originally at $x_1$ has new x coordinate 1304b in the new view plane, with value $x'_1 = \tan(\Delta\theta + \alpha)$. If both $\Delta\theta$ and $\alpha$ are small, then $\tan(\Delta\theta+\alpha) \approx \tan\Delta\theta + \tan\alpha \approx \Delta\theta + x_1$. Thus both points $x_0$ and $x_1$ are shifted approximately by amount $\Delta\theta$. This result corresponds to the pixel translation vector formula derived above, with $\omega_y=1$, $\omega_x = \Delta r_x = \Delta r_y = 0$.

FIG. 14 illustrates an example of a pose change consisting of a small translation along the x-axis by amount $\Delta r$. The initial user pose 101a, 2D projection 1302a, and mapping to plane 1305 are identical to those of FIG. 13. The user then changes pose to 101c, by moving to the right by amount 1401 ($\Delta r$). The view plane also moves to the right, the origin of the new x' axis 1402c perpendicular to the user's new position at point 1410. Objects on plane 1305 are then reprojected on the new view plane. The circle, which was originally at $x_0=0$, has new x coordinate 1403c in the new view plane, with value $x'_0 = -\Delta r/z^*$. The square which was originally at $x_1$ has new x coordinate 1404c in the new view plane, with value $x'_1 = x_1 - \Delta r/z^*$. This result corresponds to the pixel translation vector formula derived above, with $\Delta r_x = \Delta r$, $\omega_x = \omega_y = \Delta r_y = 0$.

Figure 15:
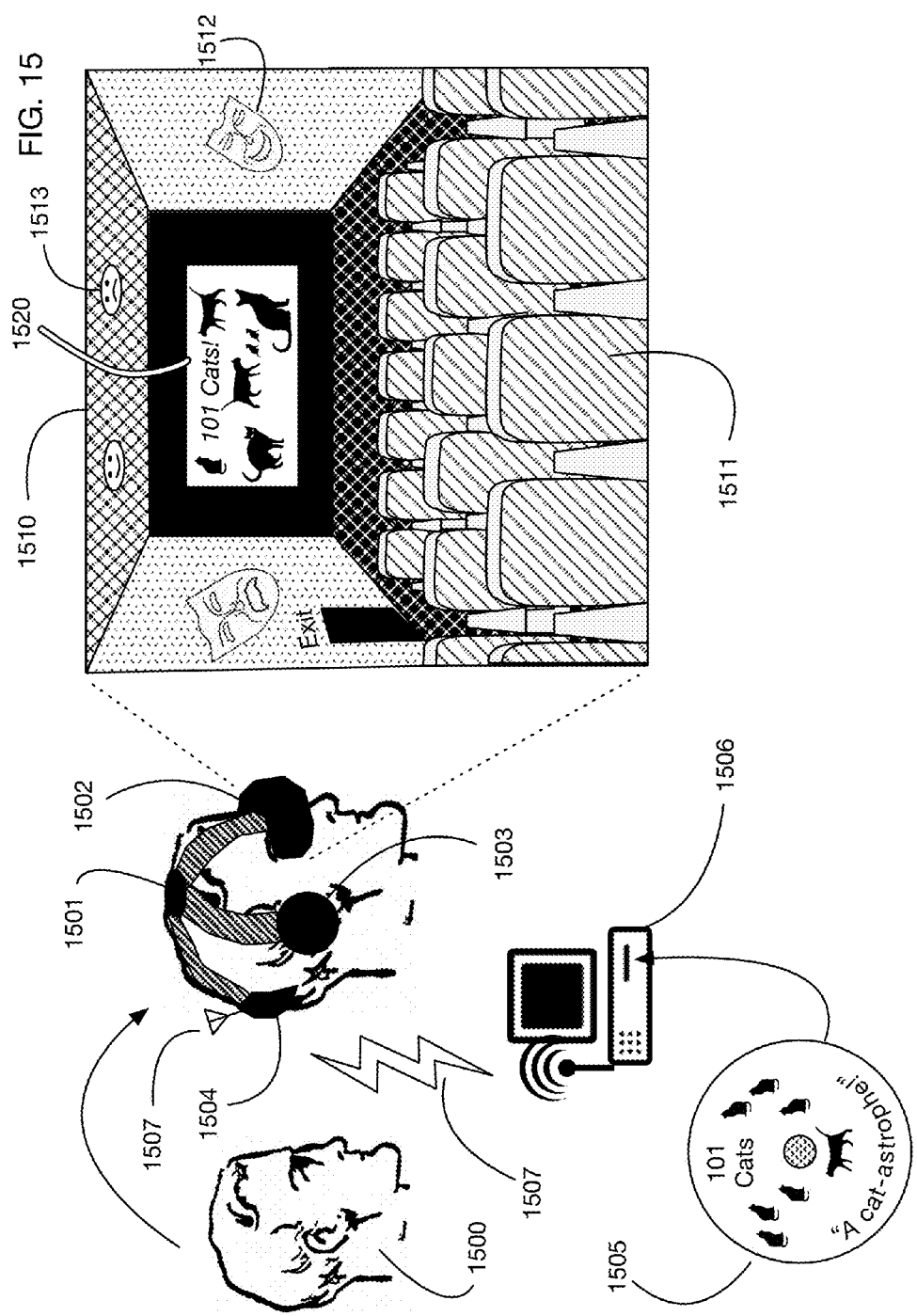
FIG. 15 illustrates an embodiment of the system that creates a virtual theater on a virtual reality headset, and plays a video on the screen of this virtual theater.

One or more embodiments of the system may generate, display or otherwise create a virtual theater for viewing videos, and display the virtual theater and the video on a virtual reality headset for example. FIG. 15 illustrates an embodiment in which user 1500 puts on a virtual reality headset 1501 that includes one or more displays 1502, headphones 1503, and one or more sensors 1504. The sensor or sensors 1504 may for example measure one or more aspects of the pose of the user, such as the user's orientation or position or both. This configuration of devices and components in a virtual reality system is illustrative; one or more embodiments may incorporate any number, configuration, types, and locations of devices or components. In one or more embodiments some or all of the components of the virtual reality system may not be attached to or worn by the user. For example, one or more embodiments may have one or more displays viewable by a user but not located in goggles or a headset on the user's head. One or more embodiments may have one or more speakers audible to a user but not positioned in headphones or speakers on the user's head. One or more embodiments may use one or more sensors that track a user's motion or pose, but that are not mounted on the user's head or on any part of a user's body. The user uses the system 1501 to watch a video 1505. The video 1505 may for example be a standard 2D or 3D movie without specific virtual reality features included in the video, or it may be a video explicitly captured or designed for virtual reality. One or more embodiments may support any types of videos, including for example movies or television shows of any format.

Because the virtual reality system creates a virtual reality environment, it may display the video in any desired surroundings. This capability provides the user with an immersive virtual experience wherein the user is viewing the video in a virtual world. In the embodiment of FIG. 15, the virtual reality system creates a virtual theater in which the user 1500 views the video 1505. The video 1505 is input into a video input subsystem that reads the video frames and sends them to the virtual reality rendering subsystem. In the illustrative example of FIG. 15, the video 1505 is stored on a memory medium such as DVD, and the video input system 1506 is for example a PC with a DVD reader. One or more embodiments may accept videos in any physical or electronic format, including for example, without limitation, CDs, DVDs, Blu-Ray™ discs, tapes, online downloads, online streaming, over-the-air reception, or streaming from a local file or media server on a computer or other device. One or more embodiments may use any type of video input device or subsystem, including for example, without limitation, a DVD reader or player, a CD reader or player, a Blu-Ray™ reader or player, a streaming video client, a television receiver, a set-top box, a media server, a software video player such as for example Windows Media Player™ or VLC™, or any standard or custom hardware or software capable of receiving, playing, relaying transferring, or generating video data. In the embodiment of FIG. 15, the video is transmitted for example wirelessly from the PC 1506 to the headset 1501 over wireless channel 1507. The headset 1501 may for example be equipped with a wireless receiver 1507 that receives the video. One or more embodiments may use any configuration to receive and process a video input and to transmit the video to a virtual reality system. For example, a video input subsystem may be integrated into a virtual reality headset, or it may be remote from the headset and communicate with the headset either via a wired or wireless connection. In one or more embodiments a virtual reality headset may for example receive streaming video directly from a media server or from an Internet connection. In one or more embodiments a PC or mobile device may receive video and may relay it to a virtual reality headset. In one or more embodiments a PC or mobile device may receive video, render the video on a screen in a virtual theater, and forward the rendered scene to a virtual reality headset. One or more embodiments may configure devices, components, and subsystems of the system in any desired manner, including distributing these devices, components, and subsystems over multiple hardware or software modules that communicate using any wired or wireless network connections.

One or more embodiments create a virtual theater environment in which a video may be viewed. In FIG. 15, virtual theater 1510 is displayed on the display or displays 1502 of the virtual reality headset 1501. This virtual theater comprises several theater environment elements that represent or depict the theater environment, such as for example a seat 1511, a decorative design 1512 on the wall of the virtual theater, and a decorative light 1513 on the ceiling of the virtual theater. These theater environment elements are illustrative; one or more embodiments may define and generate any desired virtual theater containing any desired elements. The virtual theater 1510 includes a screen 1520 onto which the video 1505 is projected. The user therefore has the virtual experience of watching the video 1505 in a theater, where the size, design, décor, and configuration of the virtual theater may be modified for example by the virtual reality system, possibly in response to the user's preferences.

Figure 16:
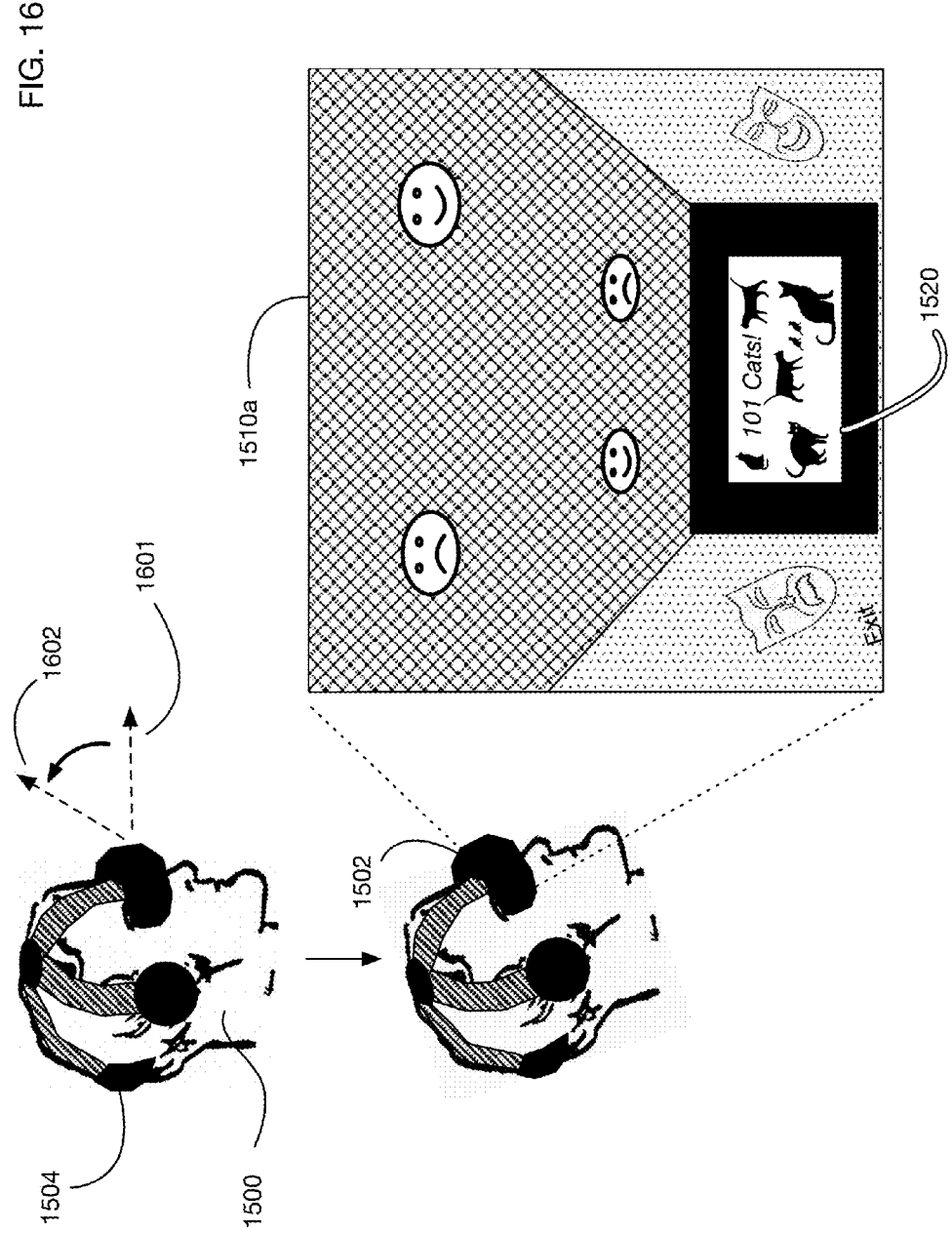
FIG. 16 illustrates changes to the user's view of the virtual theater in response to changes in the user's orientation.

If the video 1505 to be played in the virtual theater is a standard 2D video, for example, then the video image itself may not be fully immersive in that in many cases it may cover only a limited portion of a user's field of view. For example, a standard 2D movie typically does not provide a 360-degree viewing experience, unlike a completely virtual environment that may synthesize views from all possible viewing angles. However, by embedding the virtual screen in a virtual theater, the virtual reality system provides the user with an immersive experience of being in a theater or other location in which to view the video. The theater itself may provide an extended field of view surrounding the video screen, including for example a complete 360-degree field of view of the theater. In a virtual reality system equipped with one or more sensors to measure the user's pose, the system may update the views of the virtual theater in response to changes in the user's position and orientation, so that it appears to the user that he or she is inside the theater while watching the video. FIG. 16 illustrates this effect for the embodiment shown in FIG. 15. In FIG. 15, user 1500 is initially facing forward in the virtual theater, looking directly at screen 1520. In FIG. 16, the user 1500 changes his direction of view from 1601 to 1602, looking upward towards the ceiling of the virtual theater. The sensor or sensors 1504 detect this change in orientation; the system re-renders the virtual theater from the new viewpoint, and displays the new virtual theater image 1510a on display or displays 1502. The screen 1520 moves to the bottom of the user's field of view since the user looks upwards. In this illustrative example, the movie is a standard non-virtual-reality movie. Therefore the image of the movie on screen 1520 does not change in response to the user's motion; however the location and orientation of the screen 1520 does change in response to the user's motion, since the screen is part of the virtual theater created by the virtual reality system.

Figure 17:
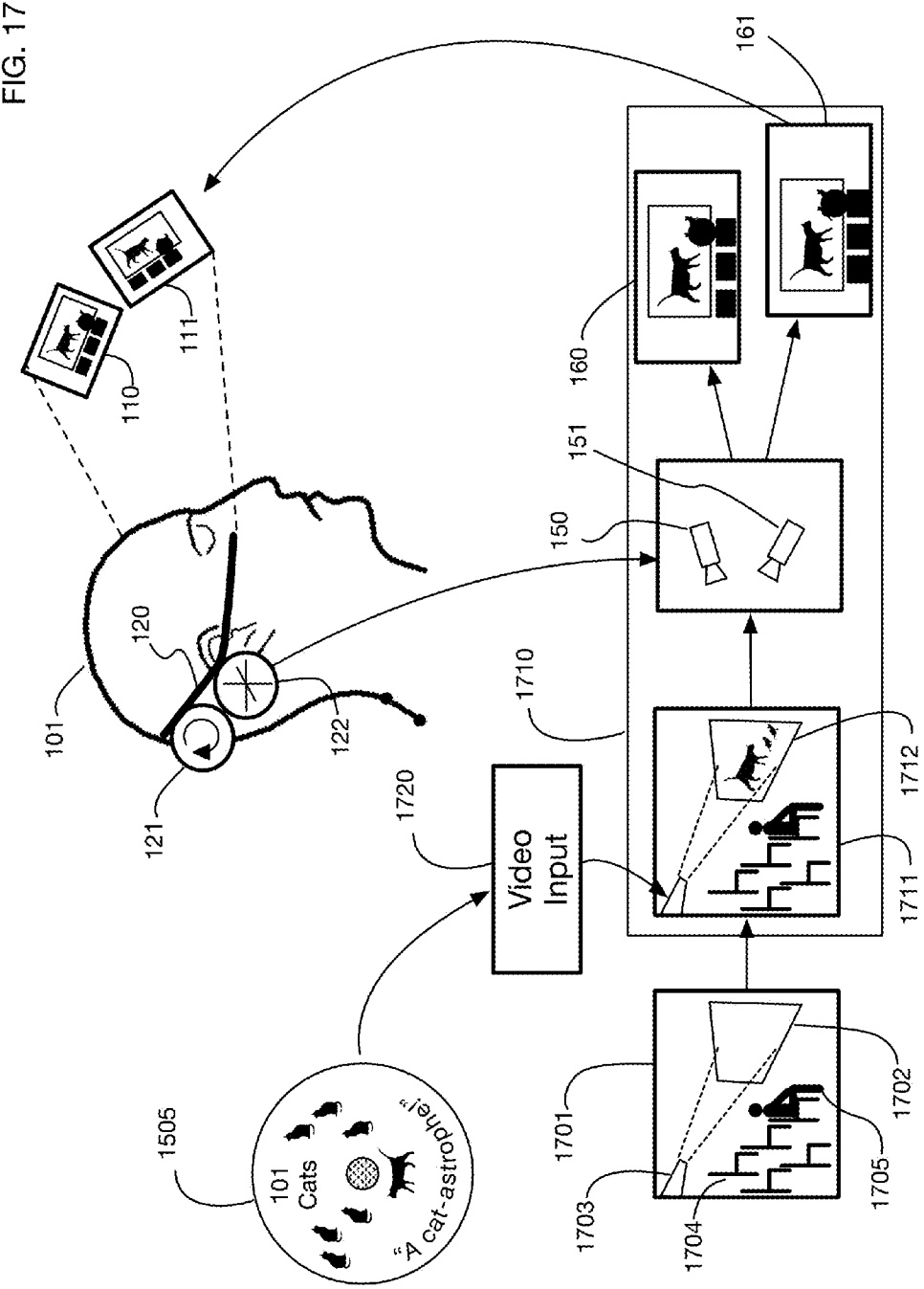
FIG. 17 shows a block diagram of an embodiment of the system, including a headset with sensors and displays, a video input to receive a video, and a video renderer that creates a virtual theater and projects the video onto the screen of the virtual theater.

FIG. 17 illustrates a block diagram of one or more embodiments of the system. User 101 wears a head-mounted device 120 that includes for example one or more pose sensors 121, and a pose analyzer 122 that receives data from the pose sensor and determines the pose of the user, or some aspect thereof. It also includes displays 110 and 111 that display the virtual theater to the user. In one or more embodiments the system may include only a single display, or more than two displays. In one or more embodiments one or more of these components may not be on a head-mounted device. The system includes or accesses a 3D virtual theater model 1701. This model includes a virtual screen 1702 and a virtual projector 1703. It may also include one or more theater environment elements that may for example define, depict, or describe any aspect of the theater's appearance, sound, or behavior. In FIG. 17, 3D model 1701 includes two illustrative theater environment elements: seats 1704, and an audience member 1705. The audience member 1705 may be distinct from the user viewing the film using the virtual reality system; an audience member may be considered part of the theater environment, for example. These theater environment elements are illustrative; one or more embodiments may include any number or types of theater environment elements in any 3D virtual theater model.

The embodiment illustrated in FIG. 17 includes a scene renderer 1710 that generates images of the virtual theater for display on the displays 110 and 111. The virtual theater is configured to play one or more videos. The system includes a video input 1720 that accepts a video 1505. The video 1505 may be in any format. In one or more embodiments the video input 1720 may be a hardware device, a software application or module, or any combination thereof. The scene renderer 1710 receives as input the 3D virtual theater model 1701, the video 1505 provided via video input 1720, and the user pose data provided by the pose analyzer 122. Each frame of the video 1505 is virtually projected from the virtual projector 1703 onto the virtual screen 1702. This frame projection generates an augmented 3D virtual theater model 1711 that contains the virtual theater elements (such as for example 1704 and 1705) and the screen 1712 that has the video frame projected onto the screen. Based on the pose of the user as determined by pose analyzer 122, one or more virtual cameras are positioned and oriented in the augmented virtual theater 3D model 1711; each virtual camera may correspond for example to one of the displays viewed by the user. In the embodiment of FIG. 17 there are two virtual cameras 150 and 151 that correspond to displays 110 and 111 respectively. The scene renderer projects the augmented 3D virtual theater model 1711 onto the image plane of each virtual camera, to form projected images 160 and 161. These projected images are then transmitted to the displays 110 and 111.

The block diagram shown in FIG. 17 is illustrative and it shows illustrative components of the system. One or more embodiments may distribute these components across hardware and software modules in any desired manner. For example, in one or more embodiments all of the components may be integrated into a virtual reality headset, such as device 120. In one or more embodiments some or all of the components may be external to a virtual reality headset, and they may communicate with the components of a virtual reality headset over either wired or wireless connections. For example, in one or more embodiments the video input 1720 and the scene renderer 1710 may be integrated into a mobile device such as a mobile phone, or into a desktop or laptop computer, or into a remote server.

Figure 18:
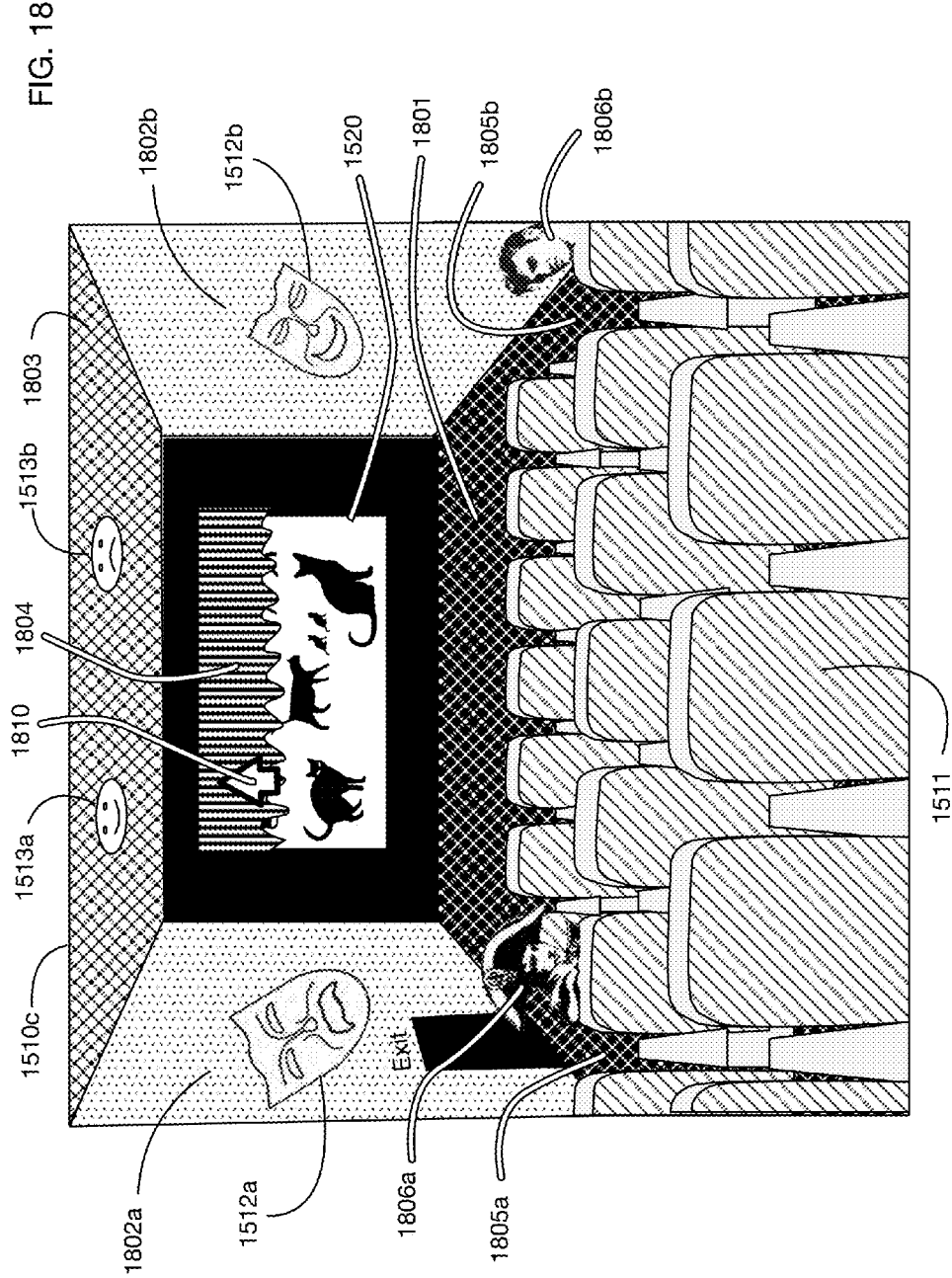
FIG. 18 illustrates elements of a virtual theater model in one or more embodiments, such as seats, audience members, and decorative elements in the virtual theater.

One or more embodiments may create any type of virtual theater or more generally any environment in which a video may be viewed. A virtual theater or other viewing environment may have any element or elements defined in the 3D model of the theater or viewing environment. FIG. 18 illustrates an embodiment with a 3D model of an indoor movie theater 1510c. The figure shows a 2D projection of this 3D model, for example as may be viewed by a user, with a video frame displayed on the virtual screen 1520. Virtual theater model 1510c illustrates several theater environment elements that may be incorporated into a virtual theater model. The model includes theater seat 1511 and several other seats arranged in rows as in a traditional movie theater. The model includes a theater floor 1801, walls 1802a and 1802b, and ceiling 1803. These elements may for example have any shape, size, color, texture, lighting, material, pattern, or decoration. One or more embodiments may include one or more decorative elements in a theater model. These decorative elements may for example correspond to decoration in a real theater or they may be created specifically for the virtual theater. The model 1510c includes for example decorative drawings, paintings, murals, fixtures, sculptures, or lights 1512a and 1512b on the walls. It also includes for example decorative drawings, paintings, murals, fixtures, sculptures, or lights 1513a and 1513b on the ceiling. It includes retractable curtains 1804 over screen 1520. It includes aisles 1805a and 1805*b*. It includes audience members 1806*a* and 1806*b*. One or more embodiments may include any audience member or members in a virtual theater model, including for example, without limitation, celebrities, historical figures, politicians, friends, enemies, acquaintances, family, colleagues, animated characters, avatars, representations of the user, cartoon characters, animals, puppets, dolls, sculptures, painted or drawn figures, computer-generated characters, actors, actresses, robots, or mythological characters.

One or more embodiments may animate one or more theater environment elements. For example, FIG. 18 illustrates an example of curtains 1804 being raised at the start of the movie, indicated by up arrow 1810. Any element may be animated in any manner. For example, without limitation, virtual audience members may move or talk, theater lights may be turned on or off or change intensity, seats may move, or animated special effects may be inserted into the virtual theater such as for example moving fog or water. In one or more embodiments animation of one or more theater environment elements may be based on the video being played. For example, an animation may shake an entire virtual theater in response to a crash or other event in a video.

Figure 19:
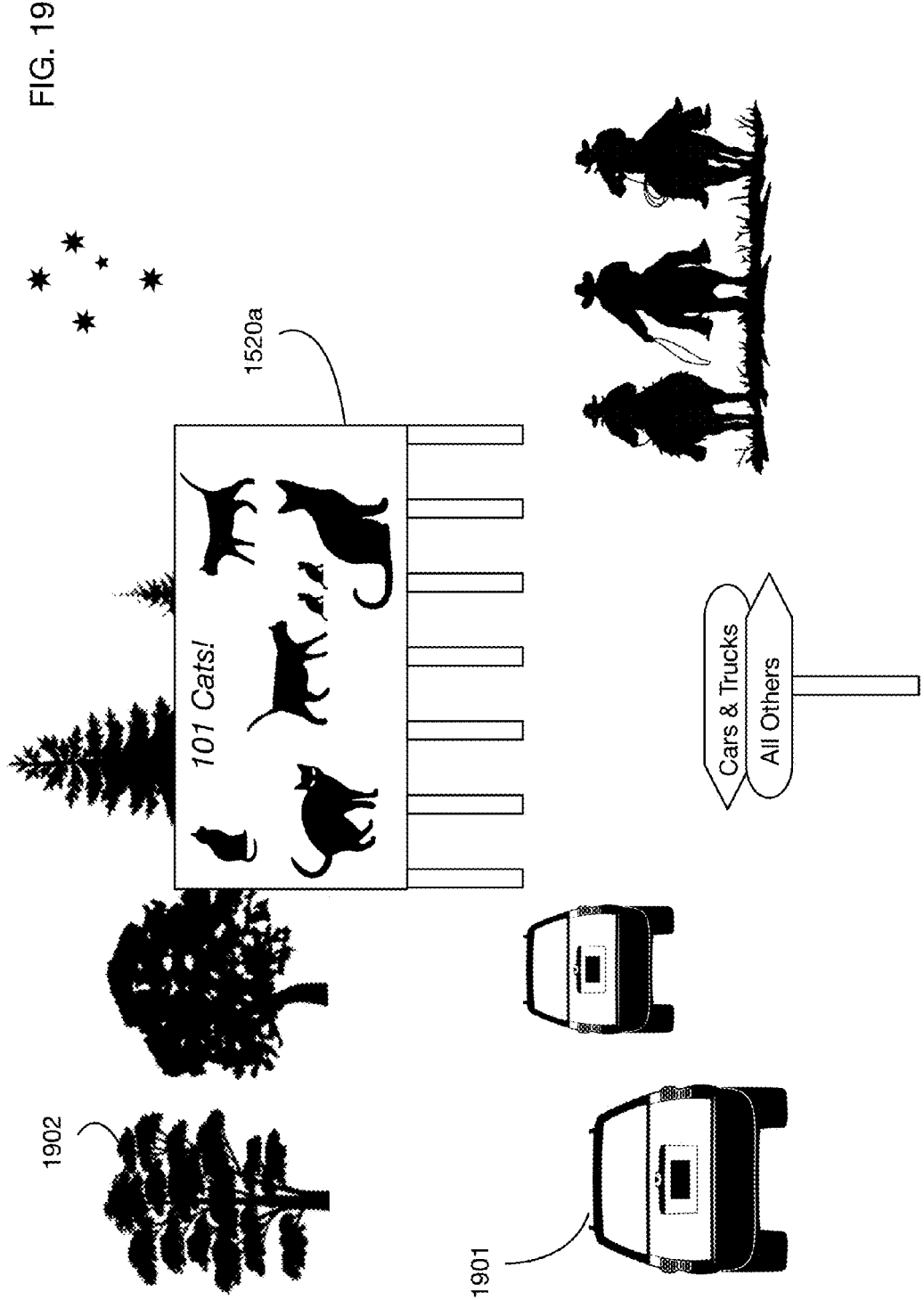
FIG. 19 illustrates an embodiment of the system that creates a virtual drive-in movie theater.
Figure 20:
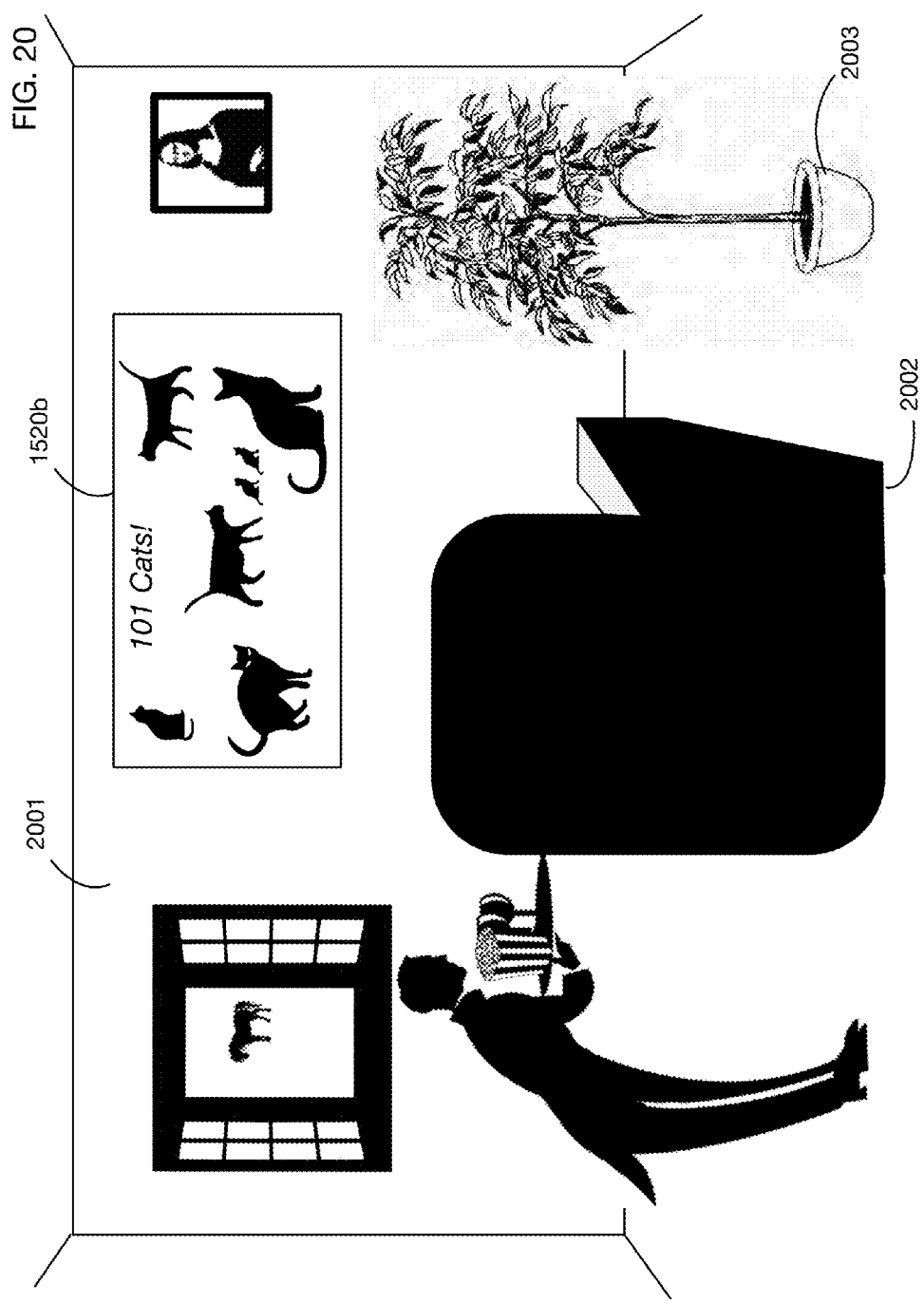
FIG. 20 illustrates an embodiment of the system that creates a virtual home theater.

One or more embodiments may create a virtual theater in any environment, not limited necessarily to an indoor movie theater. For example, FIG. 19 illustrates an embodiment that creates a virtual drive-in theater with virtual screen 1520*a* located outdoors. This embodiment illustrates various theater environment elements associated with a drive-in, such as for example a vehicle 1901 and a tree 1902. FIG. 20 illustrates an embodiment that creates a virtual home theater with virtual screen 1520*b* mounted on a wall 2001. This embodiment illustrates various theater environment elements associated with a home theater, such as for example armchair 2002 and indoor plant 2003. These examples of an indoor movie theater, a drive-in movie theater, and a home theater are illustrative; one or more embodiments may create any desired virtual environment for viewing a video with any desired elements surrounding a virtual screen.

Figure 21:
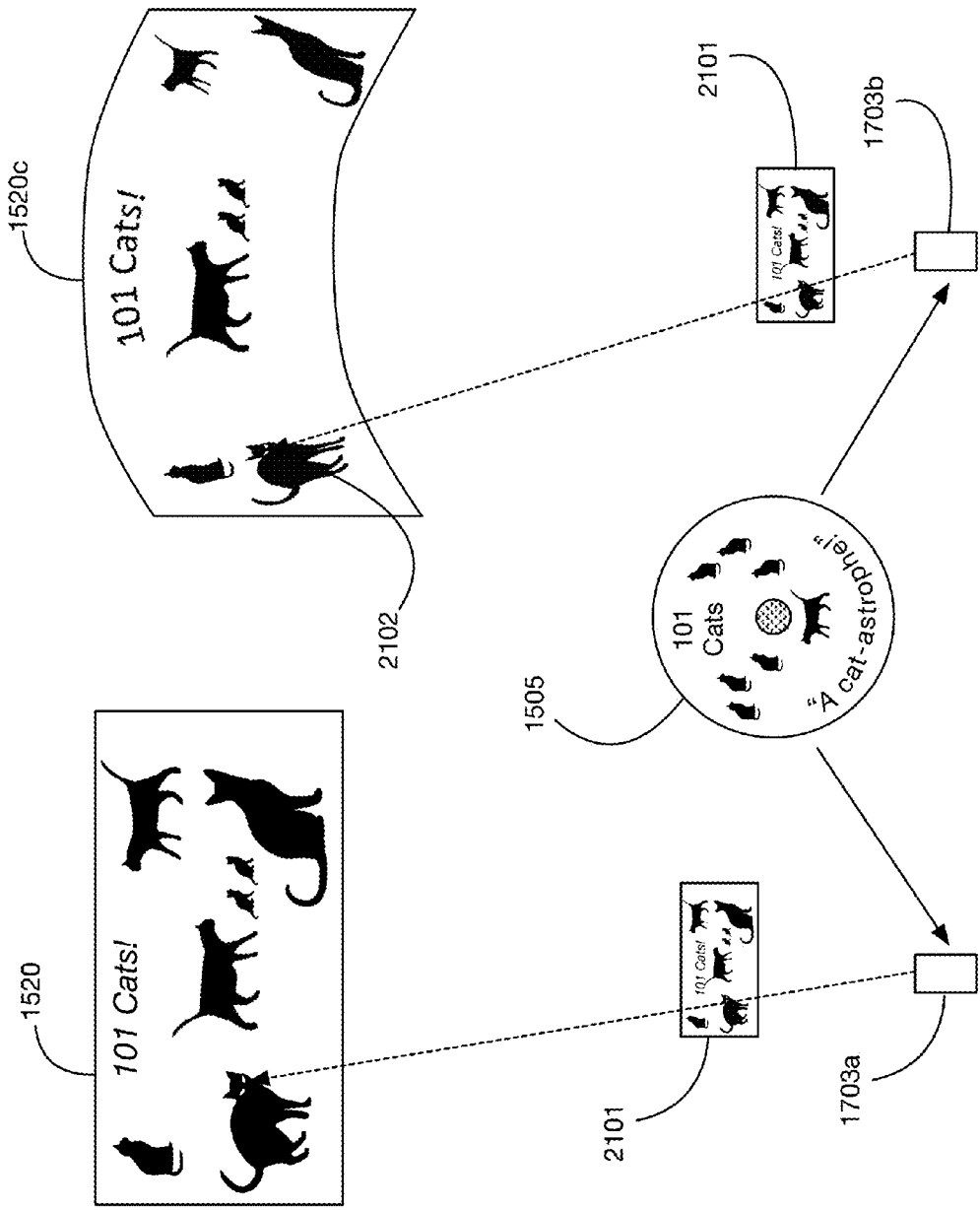
FIG. 21 illustrates an embodiment of the system that creates a virtual theater with a curved screen.

Many traditional movie theaters or home theaters use flat screens, although some specialized cinemas use curved screens. One or more embodiments of the system may create a virtual theater with any type of screen, including for example a curved screen of any size and shape. If the source video to be played in the virtual theater is designed for a flat screen display, displaying this video on a curved virtual screen may result in warping images on certain portions of the screen. In some situations, this warping may be desirable since it may create a more immersive viewing experience. FIG. 21 compares an embodiment that may use a curved virtual screen 1520*c* with an embodiment that may use a flat virtual screen 1520. If the source video 1505 comprises frames such as frame 2101 that are planar projections of the captured scene, projection of frame 2101 from virtual projector 1703*a* onto flat virtual screen 1520 results in an undistorted image. In contrast, projection of frame 2101 from virtual projector 1703*b* onto curved virtual screen 1520*c* results in a distorted image with warping of some portions of the image, such as for example the FIG. 2102 near the left edge of the curved screen. One or more embodiments may use curved virtual screens of any shape, such as for example, without limitation, all or portions of a cylinder, all or portions of a sphere, all or portions of a cube, or any other desired surface. One or more embodiments may use curved or flat virtual screens of any size and aspect ratio to encompass any desired portion of a user's field of view.

Figure 22:
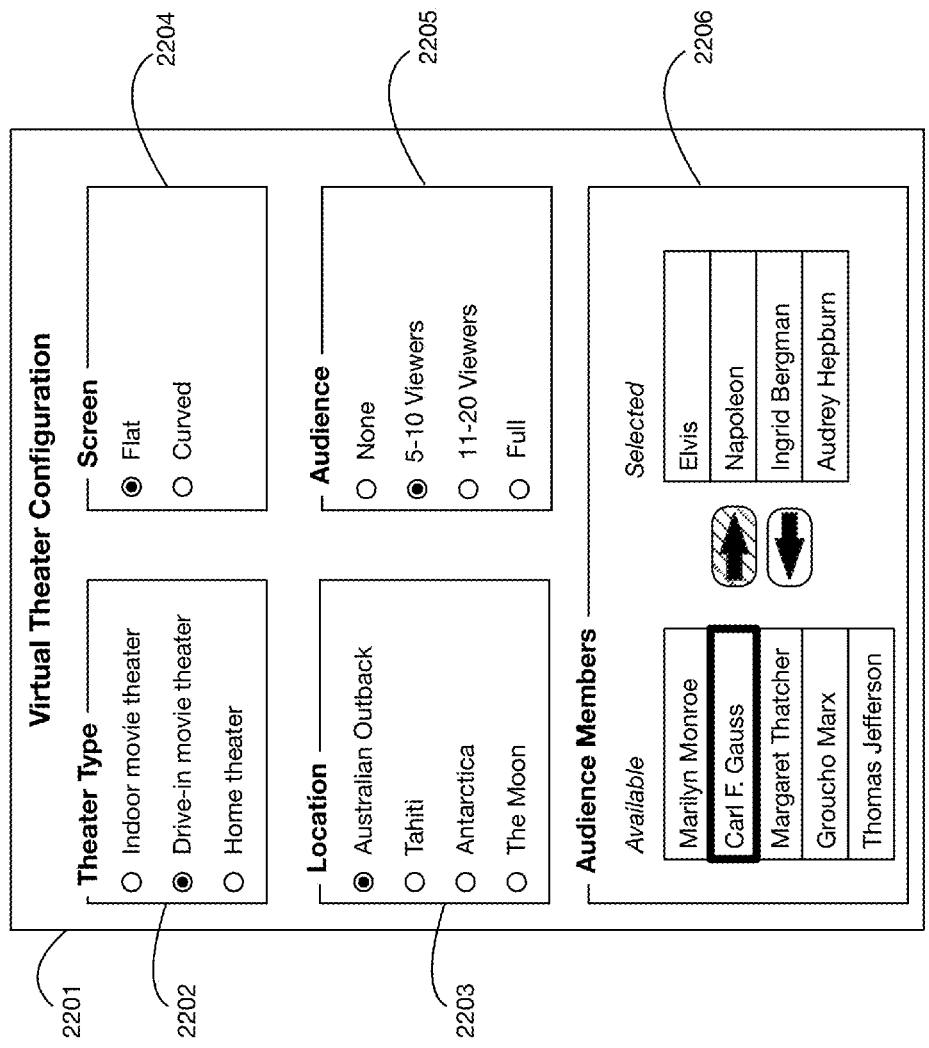
FIG. 22 shows an illustrative user interface for an embodiment of the system that allows a user to configure aspects of the virtual theater.

One or more embodiments may provide one or more interfaces that allow a user to configure and customize certain elements of the virtual theater. The user who configures the virtual theater may be identical to the viewer, or he or she may be a different user. FIG. 22 shows an illustrative user interface of an embodiment that supports user configuration of a virtual theater. This user interface may be presented for example, without limitation, on any or all of a computer, a mobile device, a screen attached to a virtual reality headset, or the display or displays of the virtual reality headset. One or more embodiments may provide any type of hardware or software control to receive configuration input from a user. Illustrative graphical user interface 2201 provides several illustrative configuration options. These configuration options are illustrative; one or more embodiments may provide any interface or interfaces to configure any aspect of a virtual theater environment. Control 2202 selects the type of theater, for example an indoor movie theater as illustrated in FIG. 18, a drive-in movie theater as illustrated in FIG. 19, and a home theater as illustrated in FIG. 20. Since the drive-in movie theater option is selected, control 2203 selects the location of this drive-in theater. Control 2204 selects either a flat virtual screen or a curved virtual screen; one or more embodiments may have additional controls to select for example the amount of curvature or the size or dimensions of the virtual screen. Control 2205 selects how many people should appear in the virtual audience. Control 2206 selects individual members of the audience; one or more embodiments may include any set of potential audience members as possible choices.

Figure 23:
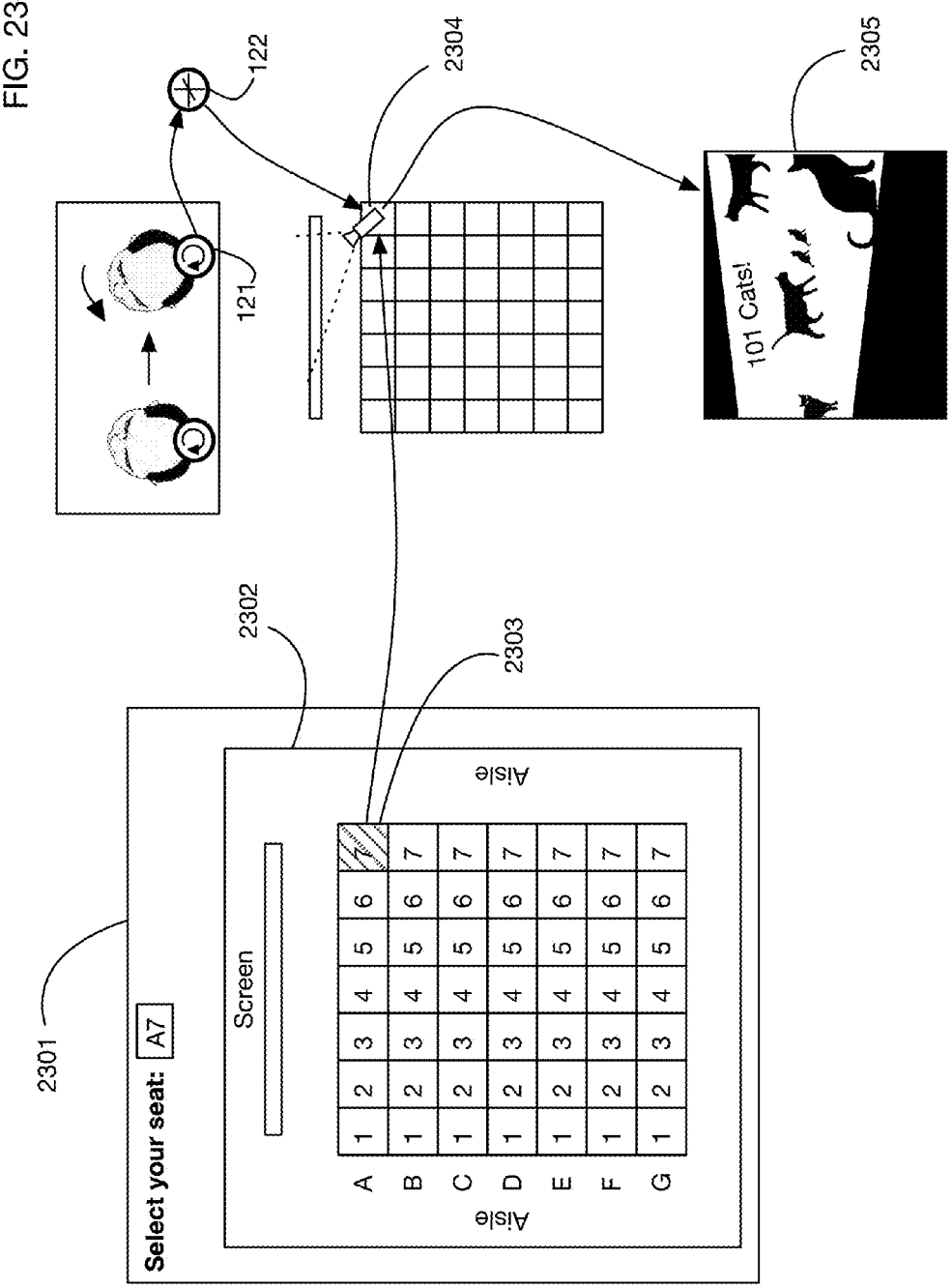
FIG. 23 illustrates an embodiment of the system that allows a user to choose his or her seat in a virtual theater.

One or more embodiments may provide one or more interfaces that allow a user to select a location in a virtual theater from which to view a video. FIG. 23 illustrates an embodiment with a configuration control 2301 that presents a seat map 2302 of a virtual theater and allows a user to select his or her seat. One or more embodiments may modify a seat map based for example on a choice of a virtual theater. One or more embodiments may use the selected location for the user, possibly in conjunction with data from the sensor or sensors or pose analyzer of the system, to determine the user's point of view in the virtual theater. Rendering of the virtual theater may be based on this user point of view. For example, in FIG. 23 the user's selected seat 2303 determines the location of the virtual camera 2304 used to render images of the virtual theater. The user has an attached sensor or sensors 121 that provide data to the pose analyzer 122, which in this example determines the orientation of the virtual camera 2304. The rendered image 2305 reflects both the location and the orientation of the virtual camera 2304. In one or more embodiments a selected location like the seat selection may be used for example to determine an initial user location, and a pose analyzer may determine changes in location from this initial location. In one or more embodiments a pose analyzer may determine only orientation, and the user's location may be fixed based on the user's location selection.

Figure 24:
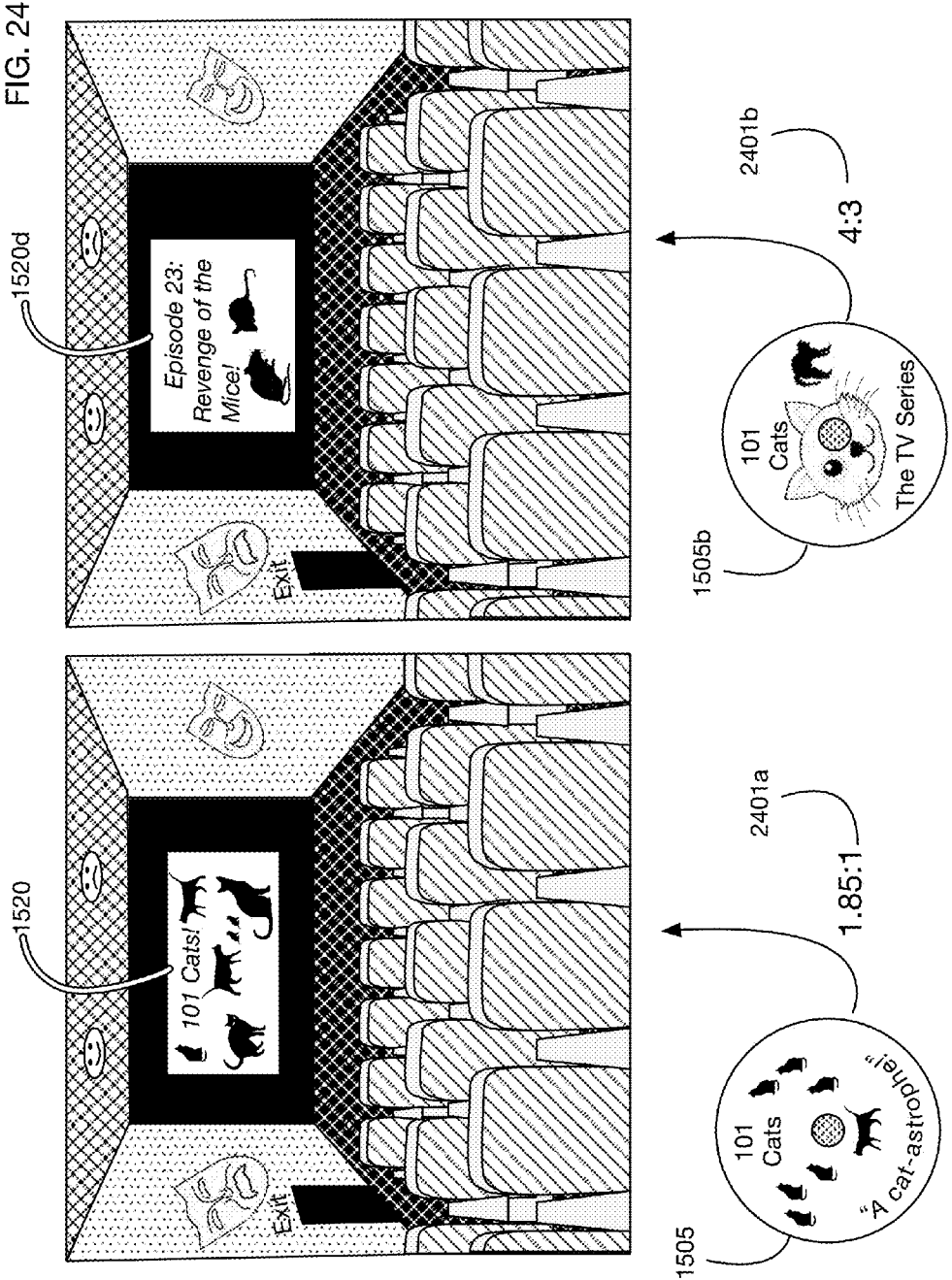
FIG. 24 illustrates an embodiment of the system that automatically adjusts the dimensions of the virtual screen to correspond to the video format.

One or more embodiments may modify the shape, dimensions, curvature, size, or other aspects of the virtual screen in a virtual theater based on the format of the video being displayed. For example, videos taken directly from cinematic footage typically have wider aspect ratios than videos designed for standard television. FIG. 24 illustrates an embodiment that determines an appropriate virtual screen shape and size from the video format. In this example, movie DVD 1505 contains a video with aspect ratio 2401*a* indicating a wide format; the system generates virtual screen 1520 to correspond to this format. Television DVD 1505*b* contains a video with aspect ratio 2401*b* indicating a narrower format; the system generates virtual screen 1520*d* to correspond to this format. One or more embodiments may generate virtual screens of any desired size, shape, curvature, or dimensions.

One or more embodiments may therefore avoid, mitigate, or optimize techniques such as letterboxing, pillarboxing, or windowboxing, which are used to display videos on screens with incompatible aspect ratios. One or more embodiments may use letterboxing, pillarboxing, windowboxing, or any other technique to display videos in any desired manner. One or more embodiments may select virtual screen characteristics automatically or allow users to modify these selections.

Figure 25:
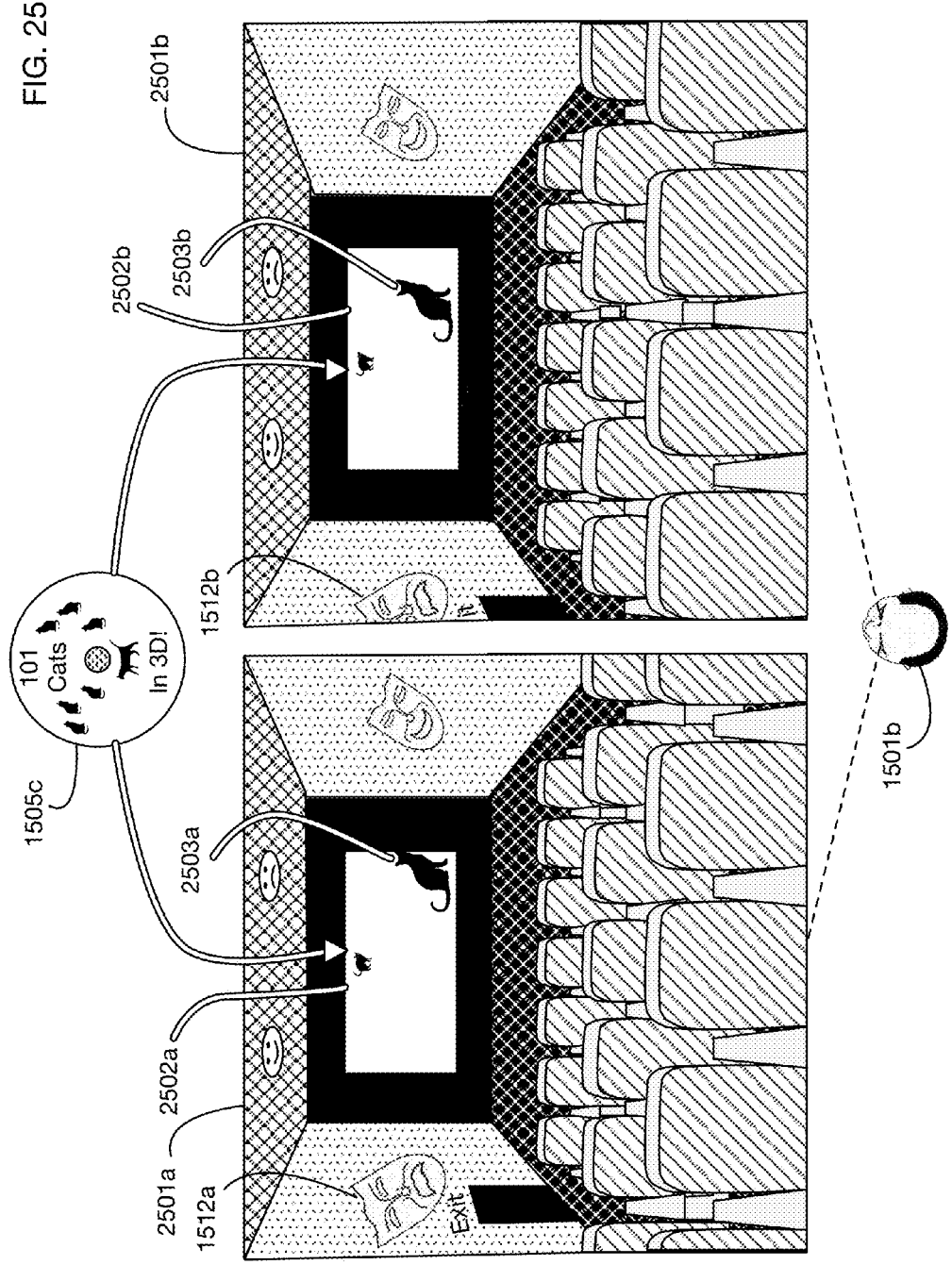
FIG. 25 illustrates an embodiment of the system that creates a stereoscopic image pair of a virtual theater playing a 3D movie.

One or more embodiments may display 3D videos in a virtual theater. 3D videos typically provide separate left and right images for each frame of the video to provide a stereoscopic depth effect. One or more embodiments may for example generate left and right projections of a virtual theater, and display these respectively on a left eye display and a right eye display. FIG. 25 illustrates an embodiment that generates stereoscopic views of a virtual theater playing 3D movie 1505*c*. The embodiment generates a left image 2501*a* that is displayed for the left eye of user 1501*b*, and right image 2501*b* that is displayed for the right eye of user 1501*b*. The left virtual screen image 2502*a* is obtained from the left stereoscopic image of a frame from video 1505*c*, and the right virtual screen image 2502*b* is obtained from the right stereoscopic image of the frame. Because movie 1505*c* is a 3D movie, objects are shifted horizontally between the left and right images of a frame based on the depth of each object in the scene, with closer objects shifted by greater amounts. Thus for example the foreground object in the scene is at location 2503*a* in the left screen image, and is shifted to the left to position 2503*b* in the right screen image. In addition to displaying the left screen image 2502*a* and the right screen image 2502*b* obtained from the stereoscopic frames of 3D movie 1505*c*, the virtual theater scene renderer generates different views of the theater environment to reflect the depth of items in the environment from the viewer. For example, the decorative face 1512*a* in the left image 2501*a* is shifted to the left to position 1512*b* in right image 2501*b*. The scene renderer for the virtual theater may for example create two virtual cameras, one for each eye, and render left eye and right eye images of the elements of the virtual theater environment. The result of these rendering operations is that the user 1501*b* may perceive 3D depth in both the movie images on the screen and in the virtual reality environment of the virtual theater.

Figure 26:
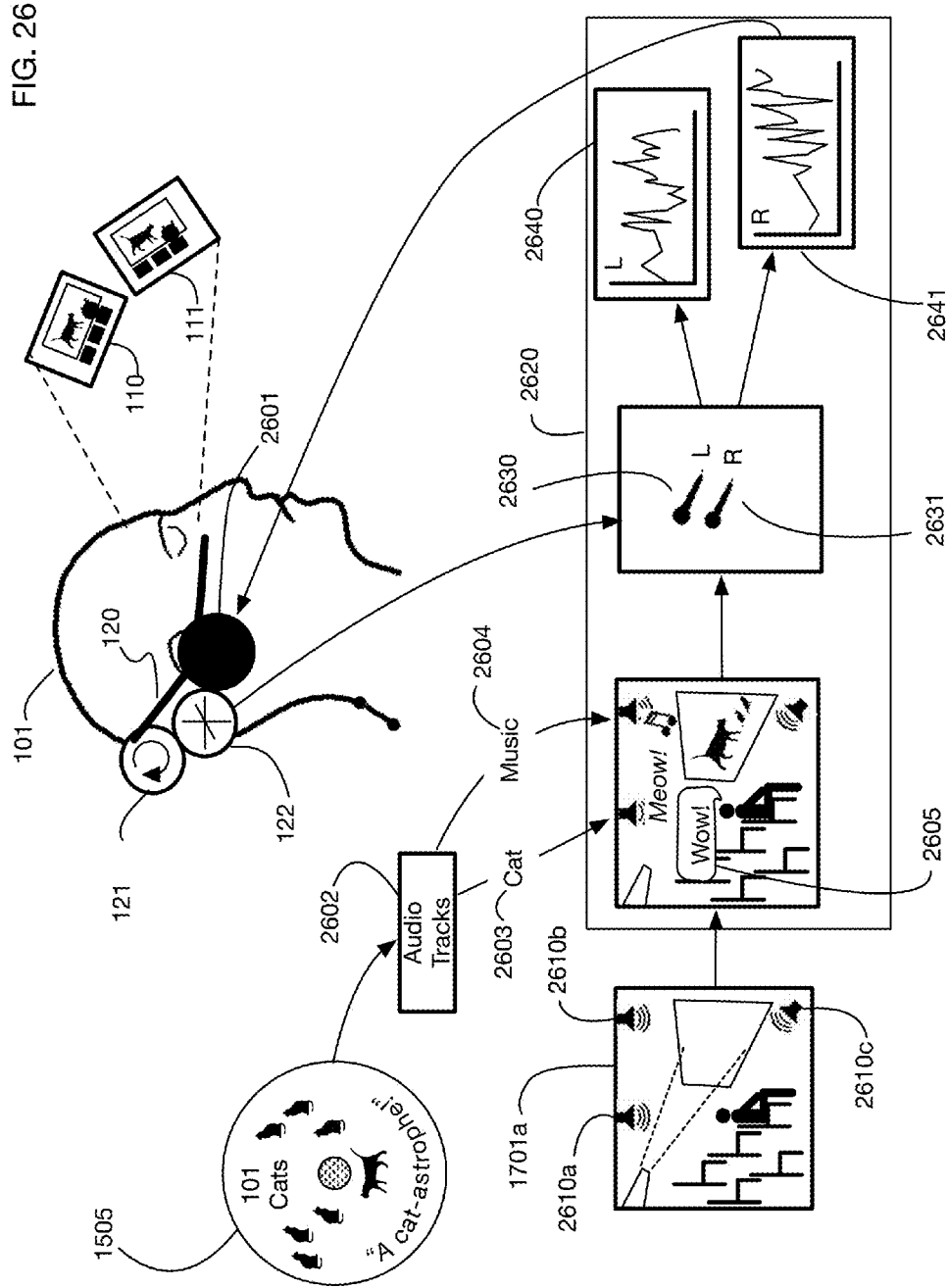
FIG. 26 illustrates an embodiment of the system that places virtual speakers in a virtual theater, and projects the sound from the speakers onto left and right ear sound waves that are played in stereo headphones.

One or more embodiments may render sounds as well as images for a virtual theater. FIG. 26 illustrates an embodiment in which virtual reality headset 120 includes stereo headphones, with a left speaker (not shown) located near the left ear of user 101, and a right speaker 2601 located near the right ear of user 101. This configuration of speakers is illustrative; one or more embodiments may use any number of speakers in any configuration, including speakers that may be on a head-mounted device or speakers that may not be on a head-mounted device. Video 1505 may include one or more audio tracks 2602 in addition to or integrated into the video frames. 3D model 1701*a* of a virtual theater may include locations, orientations, and audio parameters for one or more virtual theater speakers, such as 2610*a*, 2610*b*, and 2610*c*. One or more embodiments may define virtual theater speaker configurations to correspond for example to sound system configurations in typical movie theaters or home theaters. For example, without limitation, speaker configurations may correspond to standard 5.1 or 7.1 speaker layouts. In the embodiment shown in FIG. 26, an audio renderer 2620 projects sounds from the virtual theater speakers onto left ear and right ear receivers, and then sends the projected audio to the left and right speakers of headset 120. Audio rendering maps the audio tracks 2602 from the video 1505 onto the virtual theater speakers; in the example shown, track 2603 is sent to virtual speaker 2610*a*, and track 2604 is sent to virtual speaker 2610*b*. One or more embodiments may mix or otherwise alter audio tracks in any desired manner prior to or after sending these tracks to the virtual theater speakers. One or more embodiments may define audio parameters, such as volume, balance, and frequency response for any or all of the virtual theater speakers. One or more embodiments may provide interfaces to allow users to configure any or all of these audio parameters or any other aspects of the virtual speaker configuration of the virtual theater.

One or more embodiments may include other synthesized sounds in the virtual theater that will be rendered by the audio renderer. For example, an audience member may make noises such as 2605. These synthesized sounds may in some cases be generated by the virtual reality system rather than appearing in the audio tracks 2602 of the video. The audio renderer positions and orients two (or more) virtual microphones to receive the sounds from emitted from the virtual theater speakers and other synthesized sound sources. For example, with stereo headset speakers as illustrated in FIG. 26, the system generates a left virtual microphone 2630 for the left ear of the user, and a right virtual microphone 2631 for the right ear of the user. The location and orientation of these virtual microphones depends on the pose of the user as determined by the pose analyzer 122. The received audio on left virtual microphone 2630 is audio waveform 2640, and on right virtual microphone 2631 is audio waveform 2641. These audio waveforms are sent to the virtual reality headset speakers, such as right speaker 2601.

Figure 27:
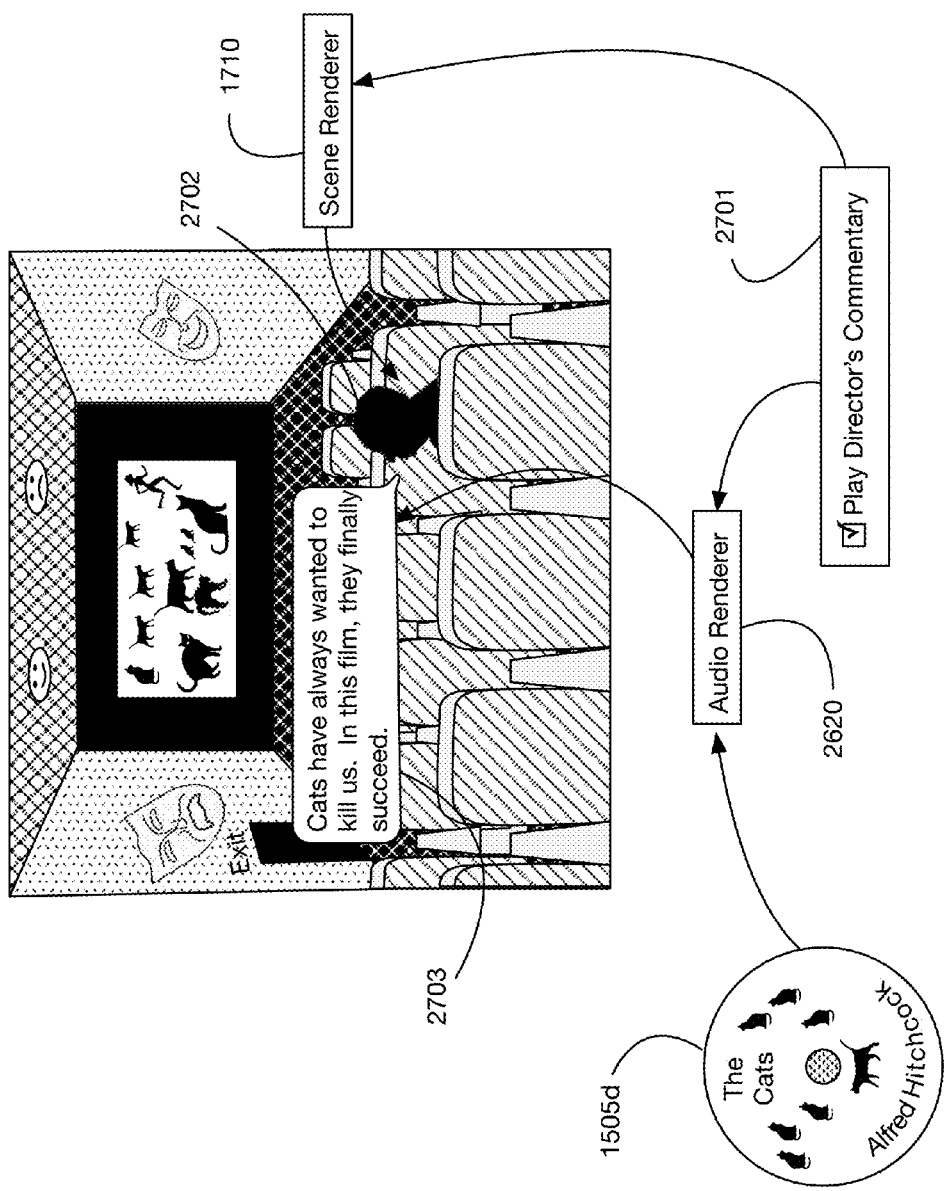
FIG. 27 illustrates an embodiment of the system that inserts a character into a virtual theater who provides a commentary on the video.

One or more embodiments may use a virtual person or character in a virtual theater, such as for example an audience member, as a virtual speaker. One or more audio tracks from a video may therefore be played via such a virtual person or character. One application of this technique may be for example to provide a film commentary that is provided with a video or is otherwise obtained or generated for the video. One or more embodiments may create a person or character in the virtual theater to provide such a commentary. The virtual commentator may be for example a 3D rendering of the person from whom the commentary was recorded. In one or more embodiments a virtual commentator may be any person or character. In one or more embodiments a user may be able to select a virtual commentator. In one or more embodiments a virtual commentator may be for example, without limitation, an actor or actress or animated character, a director, a producer, a critic, a journalist, an author, a historical figure, or a historian. FIG. 27 illustrates an example wherein video 1505*d* includes an audio track with a commentary from the director of the film. A user may for example make a selection 2701 to play the director's commentary. This selection causes the scene renderer 1710 to insert a virtual audience member 2702 into the virtual theater, and it causes the audio renderer 2620 to play the director's commentary sounds 2703 in the virtual theater from a location corresponding to the mouth of the audience member 2702. One or more embodiments may generate or obtain any additional audio tracks to enhance or explain a video, and may play these audio tracks from any location in a virtual theater, including but not limited to a location corresponding to a virtual audience member inserted into the virtual theater by the scene renderer. While the invention herein disclosed has been described by means of specific embodiments and applications thereof, numerous modifications and variations could be made thereto by those skilled in the art without departing from the scope of the invention set forth in the claims.

What is claimed is:

1. A virtual reality virtual theater system comprising:
at least one display viewable by a user;
at least one sensor that generates sensor data that measures one or more aspects of a pose of one or more body parts of said user;
a pose analyzer coupled to said at least one sensor, that calculates pose data of said pose of one or more body parts of said user, based on said sensor data generated by said at least one sensor;
a video input configured to accept a video, wherein said video comprises a plurality of frames;
a 3D model of a virtual theater, comprising
a virtual screen;
a virtual video projector; and
one or more theater environment elements; and,
a scene renderer coupled to said at least one display, said pose analyzer, said video input, and
said 3D model of said virtual theater, wherein said scene renderer
projects each of said plurality of frames successively from said virtual video projector onto said virtual screen;
receives said pose data from said pose analyzer;
calculates one or more rendering virtual camera poses, based on said pose data;
calculates one or more 2D projections of said 3D model of said virtual theater, based on said one or more rendering virtual camera poses; and
transmits said one or more 2D projections to said at least one display; and,
wherein said scene renderer is configured to modify a dimension of said virtual screen to correspond to a format of said video.

2. The system of claim 1 wherein said virtual theater is a virtual indoor movie theater.

3. The system of claim 2 wherein said one or more theater environment elements comprise one or more of
walls,
a floor,
a ceiling,
lights,
curtains,
seats,
aisles,
one or more decorative elements coupled to said walls or to said ceiling or to both of said walls and said ceiling, and,
one or more persons or characters.

4. The system of claim 1 wherein said virtual theater is a virtual outdoor movie theater.

5. The system of claim 1 wherein said virtual theater is a virtual home theater.

6. The system of claim 1 wherein one or more of said one or more theater environment elements are animated.

7. The system of claim 1 wherein
said virtual screen is curved;
said calculates one or more 2D projections of said 3D model of said virtual theater warps said plurality of frames based on a curvature of said virtual screen.

8. The system of claim 1, further comprising
a theater configuration subsystem coupled to said 3D model of said virtual theater;
wherein said theater configuration subsystem is configured to
accept a theater configuration input from said user or from a second user; and,
modify said 3D model of said virtual theater based on said theater configuration input.

9. The system of claim 1, further comprising
a user location subsystem coupled to said pose analyzer;
wherein
said user location subsystem is configured to accept a user location in said 3D model of said virtual theater from said user or from a second user;
said calculates pose data of said pose of one or more body parts of said user comprises
calculate a location component of said pose data based on said user location and optionally on said sensor data; and,
calculate an orientation component of said pose data based on said sensor data.

10. The system of claim 1 wherein
said video is a stereoscopic 3D video, wherein each frame of said plurality of frames comprises
a left eye frame, and
a right eye frame;
said pose data comprises
a left eye pose of said user; and
a right eye pose of said user;
said at least one display comprises
a left eye display region configured to be placed proximal to a left eye of said user; and
a right eye display region configured to be placed proximal to a right eye of said user; and,
for each of said plurality of frames, said scene renderer is configured to
project said left eye frame from said virtual video projector onto said virtual screen;
calculate a left eye rendering virtual camera pose, based on said pose data;
calculate a left 2D projection of said 3D model of said virtual theater, based on said left eye rendering virtual camera pose;
transmit said left 2D projection to said left eye display region;
project said right eye frame from said virtual video projector onto said virtual screen;
calculate a right eye rendering virtual camera pose, based on said pose data;
calculate a right 2D projection of said 3D model of said virtual theater, based on said right eye rendering virtual camera pose; and
transmit said right 2D projection to said right eye display region.

11. The system of claim 1, further comprising:
stereo speakers comprising
a left speaker configured to be placed proximal to a left ear of said user; and
a right speaker configured to be placed proximal to a right ear of said user; and,
an audio renderer coupled to said stereo speakers, said pose analyzer, said video input, and said 3D model of said virtual theater;
wherein
said video comprises one or more audio tracks;
said 3D model of said virtual theater further comprises
one or more virtual speakers located in said virtual theater, each having a virtual speaker location in said virtual theater; and
said audio renderer
associates each of said one or more audio tracks with one or more of said one or more virtual speakers;

sets a volume level for each of said one or more virtual speakers;
calculates an emitted sound for each of said one or more virtual speakers;
receives said pose data from said pose analyzer;
calculates a left received sound for said left ear of said user and a right received sound for said right ear of said user based on
said emitted sound for each of said one or more virtual speakers; and
said pose data;
sends said left received sound to said left speaker; and
sends said right received sound to said right speaker.

12. The system of claim 11 wherein
one or more of said one or more theater environment elements emit theater environment sounds; and,
said audio renderer calculates said left received sound for said left ear of said user and said right received sound for said right ear of said user based on
said sounds emitted from said one or more virtual speakers,
said pose data, and
said theater environment sounds.

13. The system of claim 12 wherein said theater environment sounds comprise sounds from a virtual audience.

14. The system of claim 12 wherein
said one or more audio tracks comprise one or more audio commentary tracks;
said theater environment elements comprise one or more virtual commentator characters located in said 3D model of said virtual theater; and,
said theater environment sounds comprise one or more of said one or more audio commentary tracks emitted from one or more of said one or more virtual commentator characters.

15. The system of claim 14 wherein said one or more virtual commentator characters comprise one or more of
an actor or actress or animated character in said video or in another video;
a director of said video or of another video;
a producer of said video or of another video;
a critic;
a journalist;
an author;
a historical figure; and
a historian.

16. The system of claim 1, further comprising:
an image warper coupled to said at least one display, said scene renderer, and said pose analyzer,
wherein said image warper
receives said one or more rendering virtual camera poses from said scene renderer;
receives said pose data from said pose analyzer;
calculates a change in pose between said one or more virtual camera poses and said pose data;
generates a rerendering approximation of said one or more 2D projections of said 3D model of said virtual theater on said at least one display based on said change in pose; and
modifies one or more pixels of said at least one display based on said rerendering approximation.

17. The system of claim 16, wherein said rerendering approximation comprises
calculating a pixel translation vector; and,
translating one or more pixels of said one or more 2D projections by said pixel translation vector.

18. The system of claim 17, wherein said calculating said pixel translation vector comprises
approximating said change in pose as a rotation around a unit vector $\hat{\omega}$ $\hat{\omega}_y$ and $\hat{\omega}_x$ comprising $\hat{\omega}_y$ and $\hat{\omega}_x$ by an angle $\Delta\theta$;
calculating a spatial translation vector $(\omega_y \Delta\theta, \omega_x \Delta\theta)$;
calculating a scaling factor to convert spatial distances to pixels based on pixel dimensions and fields of view of said one or more 2D projections; and
calculating said pixel translation vector by scaling said spatial translation vector by said scaling factor.

19. A virtual reality virtual theater system comprising:
at least one display viewable by a user;
stereo speakers comprising
a left speaker configured to be placed proximal to a left ear of said user;
a right speaker configured to be placed proximal to a right ear of said user;
at least one sensor that generates sensor data that measures one or more aspects of a pose of one or more body parts of said user;
a pose analyzer coupled to said at least one sensor, that calculates pose data of said pose of one or more body parts of said user, based on said sensor data generated by said at least one sensor;
a video input configured to accept a video, wherein said video comprises
a plurality of frames; and
one or more audio tracks;
a 3D model of a virtual theater, comprising
a virtual screen;
a virtual video projector;
one or more virtual speakers located in said virtual theater, each having a virtual speaker location in said virtual theater; and
one or more theater environment elements;
a theater configuration subsystem coupled to said 3D model of said virtual theater, wherein said theater configuration subsystem is configured to
accept a theater configuration input from said user or from a second user; and
modify said 3D model of said virtual theater based on said theater configuration input;
a scene renderer coupled to said at least one display, said pose analyzer, said video input, and said 3D model of said virtual theater, wherein said scene renderer
projects each of said plurality of frames successively from said virtual video projector onto said virtual screen;
receives said pose data from said pose analyzer;
calculates one or more rendering virtual camera poses, based on said pose data;
calculates one or more 2D projections of said 3D model of said virtual theater, based on said one or more rendering virtual camera poses; and
transmits said one or more 2D projections to said at least one display; and,
an audio renderer coupled to said stereo speakers, said pose analyzer, said video input, and said 3D model of said virtual theater, wherein said audio renderer
associates each of said one or more audio tracks with one or more of said one or more virtual speakers;
sets a volume level for each of said one or more virtual speakers;
calculates an emitted sound for each of said one or more virtual speakers;
receives said pose data from said pose analyzer;

calculates a left received sound for said left ear of said user and a right received sound for said right ear of said user based on
 said emitted sound for each of said one or more virtual speakers; and
 said pose data;
sends said left received sound to said left speaker; and sends said right received sound to said right speaker.

20. A virtual reality virtual theater system comprising:
at least one display viewable by a user;
at least one sensor that generates sensor data that measures one or more aspects of a pose of one or more body parts of said user;
a pose analyzer coupled to said at least one sensor, that calculates pose data of said pose of one or more body parts of said user, based on said sensor data generated by said at least one sensor;
a video input configured to accept a video, wherein said video comprises a plurality of frames;
a 3D model of a virtual theater, comprising
 a virtual screen;
 a virtual video projector; and
 one or more theater environment elements;
a scene renderer coupled to said at least one display, said pose analyzer, said video input, and
 said 3D model of said virtual theater, wherein said scene renderer
  projects each of said plurality of frames successively from said virtual video projector onto said virtual screen;
  receives said pose data from said pose analyzer;
  calculates one or more rendering virtual camera poses, based on said pose data;
  calculates one or more 2D projections of said 3D model of said virtual theater, based on said one or more rendering virtual camera poses; and
  transmits said one or more 2D projections to said at least one display; and,
a theater configuration subsystem coupled to said 3D model of said virtual theater;
 wherein said theater configuration subsystem is configured to
  accept a theater configuration input from said user or from a second user; and,
  modify said 3D model of said virtual theater based on said theater configuration input.

21. A virtual reality virtual theater system comprising:
at least one display viewable by a user;
at least one sensor that generates sensor data that measures one or more aspects of a pose of one or more body parts of said user;
a pose analyzer coupled to said at least one sensor, that calculates pose data of said pose of one or more body parts of said user, based on said sensor data generated by said at least one sensor;
a video input configured to accept a video, wherein said video comprises a plurality of frames;
a 3D model of a virtual theater, comprising
 a virtual screen;
 a virtual video projector; and
 one or more theater environment elements;
a scene renderer coupled to said at least one display, said pose analyzer, said video input, and
 said 3D model of said virtual theater, wherein said scene renderer
  projects each of said plurality of frames successively from said virtual video projector onto said virtual screen;
  receives said pose data from said pose analyzer;
  calculates one or more rendering virtual camera poses, based on said pose data;
  calculates one or more 2D projections of said 3D model of said virtual theater, based on said one or more rendering virtual camera poses; and
  transmits said one or more 2D projections to said at least one display;
stereo speakers comprising
 a left speaker configured to be placed proximal to a left ear of said user; and
 a right speaker configured to be placed proximal to a right ear of said user; and,
an audio renderer coupled to said stereo speakers, said pose analyzer, said video input, and said 3D model of said virtual theater;
 wherein
  said video comprises one or more audio tracks;
  said 3D model of said virtual theater further comprises
   one or more virtual speakers located in said virtual theater, each having a virtual speaker location in said virtual theater; and
  said audio renderer
   associates each of said one or more audio tracks with one or more of said one or more virtual speakers;
   sets a volume level for each of said one or more virtual speakers;
   calculates an emitted sound for each of said one or more virtual speakers;
   receives said pose data from said pose analyzer;
   calculates a left received sound for said left ear of said user and a right received sound for said right ear of said user based on
    said emitted sound for each of said one or more virtual speakers; and
    said pose data;
   sends said left received sound to said left speaker; and sends said right received sound to said right speaker.

22. A virtual reality virtual theater system comprising:
at least one display viewable by a user;
at least one sensor that generates sensor data that measures one or more aspects of a pose of one or more body parts of said user;
a pose analyzer coupled to said at least one sensor, that calculates pose data of said pose of one or more body parts of said user, based on said sensor data generated by said at least one sensor;
a video input configured to accept a video, wherein said video comprises a plurality of frames;
a 3D model of a virtual theater, comprising
 a virtual screen;
 a virtual video projector; and
 one or more theater environment elements;
a scene renderer coupled to said at least one display, said pose analyzer, said video input, and
 said 3D model of said virtual theater, wherein said scene renderer
  projects each of said plurality of frames successively from said virtual video projector onto said virtual screen;
  receives said pose data from said pose analyzer;

calculates one or more rendering virtual camera poses, based on said pose data;

calculates one or more 2D projections of said 3D model of said virtual theater, based on said one or more rendering virtual camera poses; and transmits said one or more 2D projections to said at least one display;

an image warper coupled to said at least one display, said scene renderer, and said pose analyzer, wherein said image warper receives said one or more rendering virtual camera poses from said scene renderer;

receives said pose data from said pose analyzer;

calculates a change in pose between said one or more virtual camera poses and said pose data;

generates a rerendering approximation of said one or more 2D projections of said 3D model of said virtual theater on said at least one display based on said change in pose; and modifies one or more pixels of said at least one display based on said rerendering approximation.

* * * * *